United States Patent
Wei et al.

(10) Patent No.: US 11,553,372 B2
(45) Date of Patent: *Jan. 10, 2023

(54) DATA TRANSMISSION METHOD AND APPARATUS THEREOF

(71) Applicant: HUAWEI TECHNOLOGIES CO., LTD., Guangdong (CN)

(72) Inventors: Anni Wei, Shenzhen (CN); Chunshan Xiong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 125 days.

This patent is subject to a terminal disclaimer.

(21) Appl. No.: 17/127,257

(22) Filed: Dec. 18, 2020

(65) Prior Publication Data

US 2021/0176660 A1    Jun. 10, 2021

Related U.S. Application Data

(63) Continuation of application No. 16/381,215, filed on Apr. 11, 2019, now Pat. No. 10,893,435, which is a
(Continued)

(51) Int. Cl.
*H04W 28/02* (2009.01)
*H04W 28/26* (2009.01)
*H04W 28/06* (2009.01)

(52) U.S. Cl.
CPC ... *H04W 28/0268* (2013.01); *H04W 28/0263* (2013.01); *H04W 28/06* (2013.01); *H04W 28/26* (2013.01)

(58) Field of Classification Search
CPC ......... H04W 28/0268; H04W 28/0263; H04W 28/06; H04W 28/26
See application file for complete search history.

(56) References Cited

U.S. PATENT DOCUMENTS 10,827,379 B2 *  11/2020  Jeong ................ H04W 72/1284
11,122,458 B2 *   9/2021  Wei ..................... H04W 28/0263
(Continued)

FOREIGN PATENT DOCUMENTS

| CN | 102469087 A | 5/2012 |
|----|-------------|--------|
| CN | 103096314   | 5/2013 |

(Continued)

OTHER PUBLICATIONS

Office Action issued in Chinese Application No. 202110186374.7 dated Jun. 2, 2022, 8 pages.
(Continued)

*Primary Examiner* — Min Jung
(74) *Attorney, Agent, or Firm* — Fish & Richardson P.C.

(57) ABSTRACT

The present disclosure relates to data transmission methods and apparatus. One example method includes receiving, by user equipment, a first message sent by a control plane network element or a user plane network element, where the first message includes a correspondence between a first quality of service identifier NQI and a first reflective quality of service identifier (RQI), obtaining, by the user equipment, a second message sent by the user plane network element, and if the second message does not carry a second RQI, generating, by the user equipment, a first quality of service rule based on the second message and the correspondence between the first NQI and the first RQI, where the second RQI is used to instruct the user equipment to activate a reflective quality of service (RQ) mechanism.

23 Claims, 8 Drawing Sheets

Related U.S. Application Data continuation of application No. PCT/CN2016/101815, filed on Oct. 11, 2016.

(56) References Cited

U.S. PATENT DOCUMENTS

| | | | |
|---|---|---|---|
| 2013/0316673 | A1 | 11/2013 | Goldner |
| 2014/0233380 | A1 | 8/2014 | Jeong |
| 2019/0261212 | A1 | 11/2016 | Li et al. |
| 2018/0270695 | A1 | 9/2018 | Bergström et al. |
| 2019/0253938 | A1 | 8/2019 | Sayenko et al. |
| 2019/0261240 | A1* | 8/2019 | Fang .................. H04W 68/005 |
| 2019/0327635 | A1 | 10/2019 | Wei et al. |
| 2020/0275302 | A1 | 8/2020 | Youn et al. |

FOREIGN PATENT DOCUMENTS

| | | |
|---|---|---|
| CN | 103209410 | 7/2013 |
| EP | 2106076 | 1/2012 |
| EP | 3039902 | 7/2016 |
| WO | 2013062363 | 5/2013 |

OTHER PUBLICATIONS

3GPP TR 23.799 V1.0.0 (Sep. 2016); 3rd Generation Partnership Project;Technical Specification Group Services and System Aspects;Study on Architecture for Next Generation System (Release 14), 423 pages.

3GPP TR 23.799 V1.0.2 (Sep. 2016);3rd Generation Partnership Project;Technical Specification Group Services and System Aspects;Study on Architecture for Next Generation System(Release 14), 423 pages.

3GPP TS 24.139 V13.1.0 (Jun. 2016);3rd Generation Partnership Project;Technical Specification Group Core Network and Terminals;3GPP system—fixed broadband access network interworking;Stage 3(Release 13),19 pages.

3rd Generation Partnership Project Technical Specification Group Services and System Aspects, "Study on Architecture for Next Generation System (Release 14) 3GPP Standard", 3GPP TR 23.799, vol. SA WG2, No. V1 .0.2,30, XP051172701, Sep. 2016, 423 pages.

ETSI TS 124 139 V13.1.0: "Universal Mobile Telecommunications System (UMTS); LTE; 3GPP System—fixed Broadband Access Network Interworking Stage 3" 3GPP TS 24.139 version 13.1.0 Release 13, XP55583469, Jul. 1, 2016, 21 pages.

Extended European Search Report issued in European Application No. 16918881.0 dated Jul. 1, 2019, 11 pages.

Huawei,"Update the QoS Solution 6.2.9: NextGen Bearer based QoS control model",SA WG2 Meeting #116-BIS, S2-164629, Aug. 29-Sep. 2, 2016, Sanya, P.R. China, 7 pages.

Intel Corporation, "Considerations on QoS aspects for NR" 3GPP Draft; R3-161832, XP051142898, Aug. 13, 2016, 3 pages.

Intel,"Interim agreements on QoS framework", Abstrct, Presented at SA WG2 Meeting #116-BIS S2-164761 (revision of S2-16xxxx), Sanya, P. R. China, Aug. 29, 2016-Sep. 2, 2016, 3 pages.

Nokia et al., "DRB mapping in UL",3GPP Draft; R2-166162, XP051150776, Oct. 2016, 4 pages.

Office Action issued in Chinese Application No. 201680089932.5 dated Apr. 26, 2020, 7 pages.

Office Action issued in Chinese Application No. 201680089932.5 dated Dec. 1, 2020, 4 pages.

Office Action issued in Indian Application No. 201937015942 dated Nov. 2, 2020, 4 pages.

PCT International Search Report and Written Opinion in International Application No. PCT/CN2016/101815, dated Jun. 28, 2017, 16 pages (With English translation).

Extended European Search Report issued in European Application No. 21194833.6 dated Feb. 28, 2022, 12 pages.

LG Electronics, "QoS Solution 2.2 Update," 3GPP SA WG2 Meeting #116 bis, S2-164831, Sanya, China, Aug. 29-Sep. 2, 2016, 7 pages.

\* cited by examiner

DATA TRANSMISSION METHOD AND APPARATUS THEREOF

CROSS-REFERENCE TO RELATED APPLICATIONS

This application is a continuation of U.S. application Ser. No. 16,381,215, filed on Apr. 11, 2019, which is a continuation of international Application No. PCT/CN2016/101815, filed on Oct. 11, 2016. All of the aforementioned patent applications are hereby incorporated by reference in their entireties.

TECHNICAL FIELD

The present application relates to the field of communications technologies, and in particular, to a data transmission method and an apparatus thereof.

BACKGROUND

As a basic network architecture, a wireless network is carrying more services. Characteristics and requirements of the services as well as radio resource scarcity determine network behavior, and the network behavior is predefined by a quality of service (QoS) rule to implement access control, and resource guarantee and scheduling. For example, when a user is making a call, and someone starts to download a file, file downloading may preempt the user's communication resource and cause disconnection of the call due to the radio resource scarcity. In this case, it is necessary to ensure that a voice call has a higher resource use priority than file downloading, to ensure a normal voice call when the radio resource is insufficient. Certainly, different services may access the wireless network, and different QoS rules need to be set to ensure that a key service is guaranteed.

In 3GPP TS24.139, reflective quality of service (Reflective QoS) is specified. The reflective QoS means that uplink data of a fixed network user equipment UE uses a same QoS mechanism as downlink data of the fixed network user equipment UE.

As defined in the 3GPP, a management manner of QoS in an EPS wireless system is as follows: QoS guarantee of various IP services provided by the EPS system may be identified by one or more service data flows (SDF) of data transmitted by using the IP services. One SDF corresponds to one EPS bearer, that is, one SDF is transmitted by using one EPS bearer, to implement QoS guarantee for the IP service. In this way, the QoS guarantee for the IP service is transformed into QoS guarantee for the EPS bearer, or a QoS-specific SDF is mapped to a QoS-specific EPS bearer. A bearer is a logical transmission path. The EPS bearer is a logical transmission path between user equipment (UE) and a PGW (PDN gateway).

The service data flow and the bearer are associated and mapped by using a traffic flow template (TFT), are associated with an RB-ID in the wireless network, and are associated with a tunnel endpoint identifier (TEID) in a core network. An uplink data flow is associated with the TFT by the UE, and a downlink data flow is associated with the TFT by the POW. Each SDF includes at least one IP service flow filter. According to different QoS requirements, different services are filtered by the TFT and provided to different bearers for transmission, to implement QoS guarantee.

To simplify QoS design of a 5G network, and reduce signaling overheads for delivering a QoS rule by a network, a reflective QoS mechanism of a fixed network, which is briefly referred to as an RQ mechanism, is introduced into the 5G network. To be specific, the UE generates a reflective quality of service rule (reflective QoS rule) for an uplink service based on a downlink data flow, and transmits uplink data based on the reflective quality of service rule. However, in the prior art, based on a reflective QoS scenario, a manner of delivering a reflective quality of service (Reflective QoS) parameter is a problem that needs to be resolved currently.

SUMMARY

Embodiments of the present application provide a data transmission method and an apparatus thereof. User equipment receives reflective QoS parameters sent by a control plane network element and a user plane network element, to implement transmission of uplink data of the user equipment based on a reflective QoS mechanism.

According to a first aspect, an embodiment of the present application provides a data transmission method, and the method may include:

receiving, by user equipment, a first message sent by a control plane network element or a user plane network element, where the first message includes a correspondence between a first quality of service identifier NQI and a first reflective quality of service identifier RQI;

obtaining, by the user equipment, a second message sent by the user plane network element; and if the second message does not carry a second reflective quality of service identifier RQI, generating, by the user equipment, a first quality of service rule based on the second message and the correspondence between the first NQI and the first RQI, where the first quality of service rule may be referred to as an implicit quality of service rule (implicit QoS rules), and may be specifically referred to as a control plane implicit quality of service rule (C-Plane implicit QoS rules).

The second RQI is used to instruct the user equipment to activate a reflective quality of service RQ mechanism.

According to the data transmission method provided in this embodiment of the present application, the RQ mechanism of the user equipment is activated based on a correspondence that is between an NQI and an RQI and that is sent by the control plane network element, and a received message that is sent by the user plane network element and that does not carry the RQI, and a quality of service rule for determining transmission of uplink data is generated based on the RQ mechanism, to implement transmission of uplink data of the user equipment based on the reflective QoS mechanism.

In comparison with first configuring a large quantity of uplink TFTs by the control plane network element for the UE, activating the RQ mechanism when downlink data sent by the user plane network element is received, and determining, in a large quantity of TFTs, the quality of service rule for transmission of uplink data save a signaling resource between the control plane and the user equipment and storage space of the user equipment.

In addition, this embodiment of the present application further implements RQ control of a coarse granularity (such as an NQI) by using a signaling plane network element, and RQ control of a fine granularity (such as a flow) by using a user plane.

In a design solution, the first message may further include a first reflective quality of service rule priority RQP, and the first RQP is used to indicate a priority order of the first quality of service rule generated by the user equipment based on the second message and the correspondence between the first NQI and the first RQI, to indicate the priority order of the first quality of service rule during transmitting the uplink data by the user equipment, and to guarantee QoS quality of a communication service.

In another design solution, the method may further include:

if the second message carries the second RQI, generating, by the user equipment, a second quality of service rule based on the second message. The second quality of service rule may also be referred to as an implicit quality of service rule, and may be specifically referred to as a user plane implicit quality of service rule (U-Plane implicit QoS rules).

The design solution may implement RQ control of a fine granularity, for example, RQ control of a data flow.

In still another design solution, the first message may further include a second reflective quality of service rule priority RQP, and the second RQP is used to indicate a priority order of the second quality of service rule generated by the user equipment based on the second message.

In this embodiment of the present application, the user equipment may receive indication information that is delivered by the control plane network element and that carries the priority order of the user plane implicit quality of service rule, to indicate the matching priority order of the user plane implicit quality of service rule, so as to ensure the QoS guarantee of a communication service. In this embodiment of the present application, the matching priority order of the user plane implicit quality of service rule is usually a highest matching priority during transmitting uplink data of all services by the user equipment, and a value of the priority order may be a default value.

In yet another design solution, at least one of the first message or the second message may include an aging time, the aging time is a time threshold from last use of the first quality of service rule or the second quality of service rule to a current moment, and the method may further include:

when a time for which the first quality of service rule or the second quality of service rule is not used reaches the aging time, deleting, by the user equipment, the first quality of service rule or the second quality of service ride with an unused time that reaches the aging time, so that the user equipment manages a quality of service rule, and also deletes some quality of service rules that are not temporarily used, thereby saving storage space of the user equipment and improving system performance.

In another design solution, the at least one of the first message or the second message may further include at least one of an RQI use time, an RQI use granularity, an RQI use mode, or a use granularity of the aging time, where the RQI use time is a use time of the first quality of service rule or the second quality of service rule; the RQI use granularity is a use unit of the first quality of service rule or the second quality of service rule; and the RQI use mode is a parameter mode of a temporary uplink filter included in the first quality of service rule or the second quality of service rule.

According to a second aspect, an embodiment of the present application provides a data transmission method, and the method may include:

receiving, by a user plane network element, a first message sent by a control plane network element, where the first message includes a correspondence between a downlink filter, a quality of service identifier NQI, and a reflective quality of service identifier RQI, and includes marking indication information of the RQI;

determining, by the user plane network element based on the downlink filter, a quality of service identifier NQI corresponding to a quality of service rule used by downlink data, and marking the downlink data based on the marking indication information of the RQI; and sending, by the user plane network element, a second message to user equipment, where the second message is used to instruct the user equipment to or not to use a reflective quality of service RQ mechanism.

According to the data transmission method provided in this embodiment of the present application, the RQI is received through a user plane, or a signaling plane and a user plane, to activate the RQ mechanism, so as to implement transmission of uplink data of the user equipment based on the reflective QoS mechanism, and implement fine-grained quality of service control. In addition, in comparison with configuring an RQI mark in a downlink packet corresponding to each reflective service granularity according to the quality of service rule received by the user plane network element, in this embodiment of the present application, the user plane network element marks the downlink packet with an RQI based on the received marking indication information of the RQI, thereby avoiding configuring the RQI mark in the downlink packet corresponding to each reflective service granularity, and saving transmission resources of an NG3 interface and an air interface.

In a design solution, the first message may further include a reflective quality of service rule priority RQP, and the RQP is used to indicate a priority order for sending the second message by the user plane network element to the user equipment.

In another design solution, the first message further includes at least one of a use time of the RQI, a use granularity of the RQI, a use mode of the RQI, an aging time, or a use granularity of the aging time, where the aging time is a time threshold from last use of a temporary uplink filter included in a quality of service rule generated by the user equipment based on the second message to a current moment; the RQI use time is a use time of the quality of service rule generated by the user equipment; the RQI use granularity is a use unit of the quality of service rule generated by the user equipment; and the RQI use mode is a parameter mode of the temporary uplink filter.

According to a third aspect, an embodiment of the present application provides a data transmission apparatus. The apparatus may be user equipment, and the user equipment includes a receiving unit, an obtaining unit, and a generation unit. For a principle for resolving problems and beneficial effects of the apparatus, refer to the first aspect, the possible design solutions of the first aspect, and the beneficial effects brought by the first aspect and the possible design solutions of the first aspect. Therefore, for implementation of the apparatus, refer to implementation of the method. For brevity, details are not described herein again.

According to a fourth aspect, an embodiment of the present application further provides a data transmission apparatus. The apparatus may be a user plane network element, and the user plane network element includes a receiving unit, a determining unit, and a sending unit. For a principle for resolving problems and beneficial effects of the apparatus, refer to the first aspect, the possible design solutions of the second aspect, and the beneficial effects brought by the first aspect and the possible design solutions of the second aspect. Therefore, for implementation of the apparatus, refer to implementation of the method. For brevity, details are not described herein again.

According to a fifth aspect, an embodiment of the present application provides user equipment. The user equipment includes a transmitter, a receiver, a processor, and a memory, where the transmitter and the receiver are configured to send and receive signaling or/and data to and from an external device, the memory is configured to store computer executable program code, and the program code includes an instruction. When the processor executes the instruction, the solutions in the method design in the first aspect and the solutions in the apparatus design in the third aspect are implemented. For an implementation of resolving problems and beneficial effects of the user equipment, refer to the first aspect, the possible design solutions of the first aspect, and the beneficial effects. Therefore, for implementation of the user equipment, refer to implementation of the method in the first aspect. For brevity, details are not described herein again.

According to a sixth aspect, an embodiment of the present application provides a user plane network element. The user plane network element includes a transmitter, a receiver, a processor, and a memory, where the transmitter and the receiver are configured to send and receive signaling or/and data to and from an external device, the memory is configured to store computer executable program code, and the program code includes an instruction. When the processor executes the instruction, the design solutions of the method in the second aspect and the design solutions of the apparatus in the fourth aspect are implemented. For an implementation of resolving problems and beneficial effects of the user plane network element, refer to the first aspect, the possible design solutions of the first aspect, and the beneficial effects. Therefore, for implementation of the user equipment, refer to implementation of the method in the first aspect. For brevity, details are not described herein again.

Based on the foregoing technical solutions, according to the data transmission method and the apparatus thereof provided in the embodiments of the present application, the user equipment receives a message that is sent by the control plane network element and that includes a correspondence between the quality of service identifier NQI and the reflective quality of service identifier RQI, and a message sent by the user plane network element, and generates the first quality of service rule based on the received messages, so that when receiving uplink data that meets the first quality of service rule, the user equipment transmits the uplink data according to the first quality of service rule, to transmit uplink data of the user equipment based on the reflective QoS mechanism.

BRIEF DESCRIPTION OF DRAWINGS

To describe the technical solutions in embodiments of the present application more clearly, the following briefly introduces the accompanying drawings required for describing the embodiments of the present application. Apparently, the accompanying drawings in the following description show merely some embodiments of the present application, and a person of ordinary skill in the art may derive other drawings from these accompanying drawings without creative efforts.

DESCRIPTION OF EMBODIMENTS

The present application provides a data transmission method and an apparatus thereof, so that a reflective QoS mechanism of a fixed network may be introduced into a future 5G communications network, and QoS used by user equipment to transmit uplink data may be consistent with QoS used to transmit downlink data.

In the embodiments of the present application, a core network (CN) device sends a reflective quality of service parameter to the user equipment UE through a signaling plane and a user plane, so that the user equipment generates a quality of service rule based on the reflective quality of service parameter, and uses same quality of service guarantee when transmitting the uplink data and the downlink data.

The reflective quality of service parameter may include a reflective quality of service identifier RQI granularity, a reflective quality of service rule priority (RQP), and a reflective quality of service identifier (Reflective QoS Indication, RQI).

The user equipment UE may receive a message that is sent by a control plane (Control Plane, CP) network element and that includes a correspondence between a next generation quality of service identifier (Next Generation QoS index, NQI) and the RQI, and a message sent by a user plane (UP) network element, so that the user equipment generates a quality of service rule based on the messages received from the control plane network element and the user plane network element. When the uplink data received by the user equipment UE meets the quality of service rule, the user equipment UE transmits the uplink data by using the quality of service rule.

The message sent by the user plane network element may not carry the RQI. When receiving the message sent by the user plane network element, the user equipment obtains the NQI for sending the message by the user plane network element, activates the RQ mechanism based on the correspondence that is between the NQI and the RQI and that is received from the control plane network element, and generates the quality of service rule.

The message sent by the user plane network element may carry the RQI. When receiving the message sent by the user plane network element, the user equipment activates the RQ mechanism, and generates the quality of service rule for transmitting the uplink data.

The generated quality of service rule includes an uplink filter, and a data radio bearer (DRB) consistent with that for transmitting the downlink data. Details are shown in FIG. 1.

Figure 1:
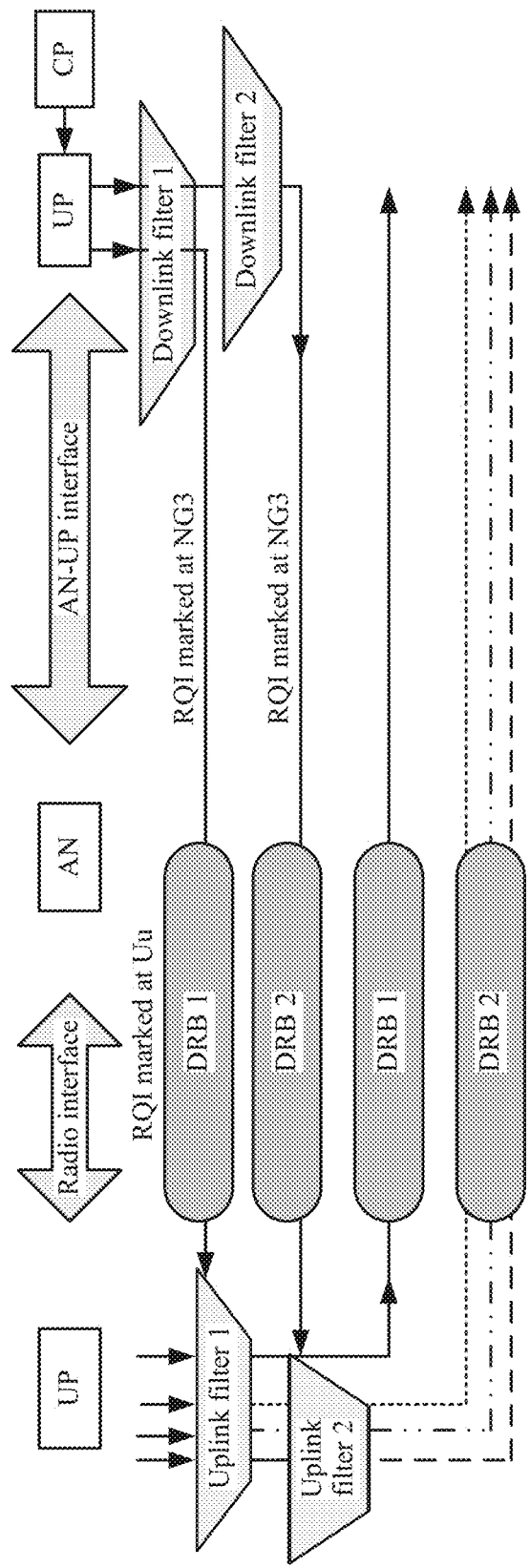
FIG. 1 is a schematic diagram of transmission of uplink data based on reflective QoS according to an embodiment of the present application.

FIG. 1 is a schematic diagram of transmission of uplink data based on reflective QoS according to an embodiment of the present application. A control plane network element CP sends a quality of service rule (QoS rule) to a user plane network element UP, and the quality of service rule includes a correspondence between a downlink packet filter, a next generation quality of service identifier (NQI), and a reflective quality of service identifier RQI, and includes marking indication information of the RQI. The user plane network element sends a message to user equipment UE based on the received quality of service rule. The message is filtered by the downlink filter to determine corresponding quality of service, for example, the next generation quality of service identifier NQI, and the message is sent to the UE by using a corresponding DRB in an access network. For example, in FIG. 1, the message is sent to the UE by using a DRB 1 and a DRB 2. The message may include the reflective quality of service identifier RQI, used to instruct the UE to activate an RQ mechanism.

In addition, the message may be a signaling plane message, or may be a user plane message. The signaling plane message is an instruction sent by the core network to the user equipment. The user plane message is data sent by the core network to the user equipment, and the RQI may be configured in a header of a packet.

After receiving the message sent by the UP, the UE activates the RQ mechanism based on the RQI in the message, and reversely determines, based on the message, a quality of service rule for transmitting uplink data. The quality of service rule includes information such as an uplink filter.

When the UE needs to transmit the uplink data, the UE filters, by using the uplink filter, the to-be-transmitted uplink data. If there is uplink data matching the uplink filter, the UE uses a DRB corresponding to the uplink filter to transmit the uplink data. As shown in FIG. 1, the UE transmits the uplink data by using the DRB 2.

It should be noted that, in FIG. 1, uplink and downlink data may be transmitted through an access network (AN). An interface between the UE and the AN is referred to as a radio interface. An interface between the AN and the UP may be referred to as an AN-UP interface. In an existing LTE network, an interface between the AN and an S-GW is an S1 interface, and an interface between the S-GW and a P-GW is an S5/S8 interface.

In this embodiment of the present application, a message that carries the RQI and is sent by the UP to the UE may be transmitted through an NG3 interface between the UP and the AN, and a Uu interface between the AN and the UE, or is transmitted by using an NG3 bearer and a Uu bearer.

Figure 2:
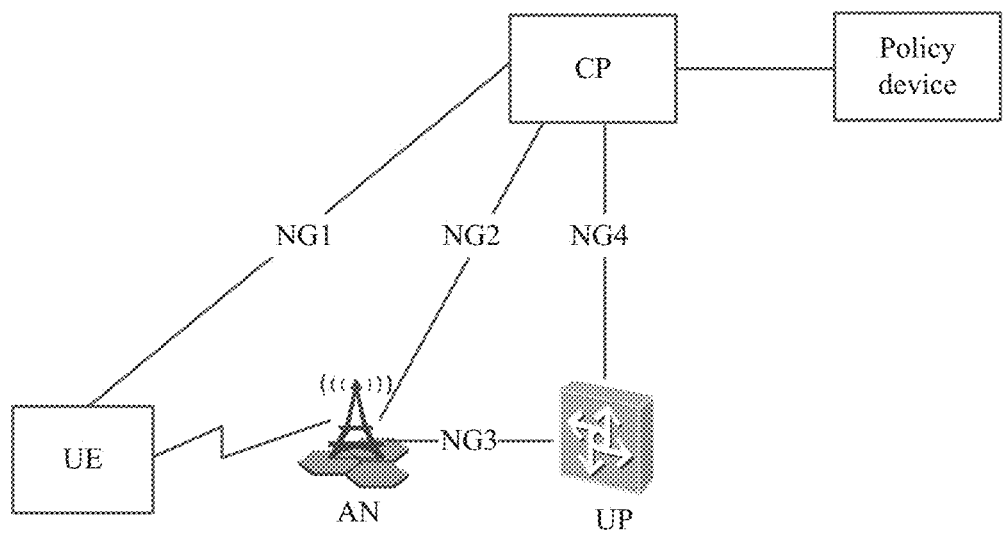
FIG. 2 is an architectural diagram of a system of a communications network according to an embodiment of the present application.

FIG. 2 is an architectural diagram of a system of a communications network according to an embodiment of the present application. As shown in FIG. 2, the system includes user equipment UE, a control plane network element CP, a user plane network element UP, an access network AN, and a policy function device.

The control plane network element is responsible for mobility management and control policy delivering in a mobile network, for example, delivering a quality of service rule for packet processing to the user plane, to instruct the user plane to filter, based on the quality of service rule, to-be-sent downlink data and perform RQI marking. The control plane network element CP may be a mobility management entity (MME), a gateway control plane, or all or some of control functions formed by combining the mobility management entity and the gateway control plane.

The user plane network element UP is responsible for data processing and forwarding. The user plane network element may be a physical or virtual device such as a forwarding plane function of a PDN GW, a forwarding plane function of an S-GW, a router, or a switch.

The access network AN provides a radio access service for the user equipment, and includes but is not limited to an eNodeB, an access point (AP), and the like.

The user equipment UE is a network terminal device, including but not limited to a mobile phone, a network access device, an Internet of Things terminal device, and the like.

The following clearly describes the technical solutions in the embodiments of the present application with reference to the accompanying drawings in the embodiments of the present application. Apparently, the described embodiments are some rather than all of the embodiments of the present application. All other embodiments obtained by a person of ordinary skill in the art based on the embodiments of the present application without creative efforts shall fall within the protection scope of the present application.

Figure 3:
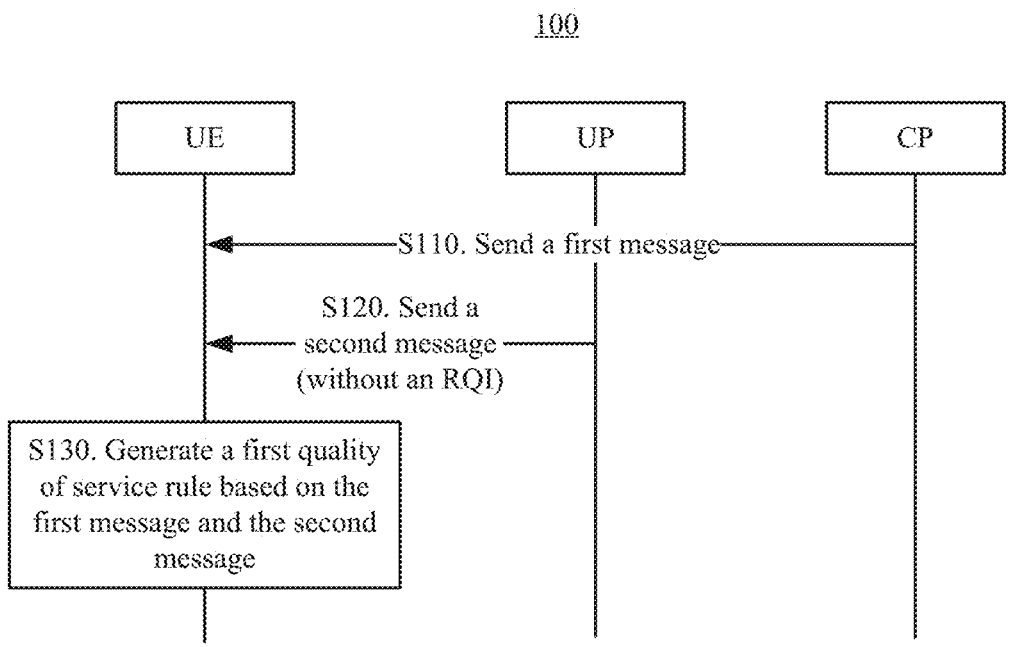
FIG. 3 is a flowchart of a data transmission method according to an embodiment of the present application.

FIG. 3 is a flowchart of a data transmission method according to an embodiment of the present application. As shown in FIG. 3, the method 100 includes the following steps.

S110. User equipment receives a first message sent by a control plane network element.

The first message may include a correspondence between a first quality of service identifier NQI and a first reflective quality of service identifier RQI.

In other words, the control plane network element may send, by using a signaling message, a reflective quality of service parameter including a correspondence between an NQI and an RQI to the user equipment.

The first message may be specifically, for example:

RQI granularity (NQI1, RQI (no marking)).

The first message may be referred to as a quality of service rule, and an information parameter included therein, such as the NQI or the RQI, may be referred to as a reflective quality of service parameter. The message is used to indicate that:

each piece of data transmitted by using a quality of service rule corresponding to the NQI1 is not marked with an RQI. In other words, an RQ mechanism is activated for all data transmitted by using the quality of service rule corresponding to the NQI1. Downlink data matching a DL packet filter 1 is transmitted by using the quality of service rule NQI1, and the reflective QoS mechanism needs to be activated, but RQI marking does not need to be performed in a packet.

In this embodiment of the present application, the first message may alternatively be specifically, for example:

UL packet filter 3→(NQI3, no RQI).

The message may be referred to as an explicit quality of service rule (explicit QoS rules), and a parameter included therein may be referred to as an explicit quality of service parameter (explicit QoS Parameters). The message is used to indicate that:

uplink data matching the UL packet filter 3 is transmitted by using a quality of service rule corresponding to the NQI3, and the reflective QoS mechanism does not need to be activated.

In addition, in this embodiment of the present application, the first message may further carry a reflective quality of service rule priority RQP, to indicate a priority order for transmitting uplink data by the user equipment by using a corresponding quality of service rule.

S120. The user equipment receives a second message sent by a user plane network element.

The second message may include a packet sent by the user plane network element to the user equipment, and a quality of service identifier NQI corresponding to quality of service used for transmitting the packet. The packet may carry a reflective quality of service identifier RQI used to instruct the user equipment to activate the reflective quality of service RQ mechanism. The packet may not carry the reflective quality of service identifier RQI. The RQI is used to instruct the user equipment to activate the reflective quality of service RQ mechanism. In this embodiment of the present application, the user plane network element may perform RQI marking on a packet based on the quality of service rule that is sent by the control plane network element and that includes a correspondence between a downlink packet filter, the next generation quality of service identifier, and the reflective quality of service identifier RQI, and marking indication information of the RQI. The downlink packet filter includes content such as a source IP address, a destination IP address, a source IP port number, a destination IP port number, and a protocol type.

The user plane network element filters, by using the downlink packet filter, to-be-sent downlink data, selects specific quality of service for the to-be-sent downlink data, and determines, based on the marking indication information of the RQI, whether the RQI needs to be added to or configured in a header of a to-be-sent downlink packet.

It should be further noted that, in this embodiment of the present application, the downlink packet filter may be briefly referred to as a downlink filter (DL filters), and the next generation quality of service identifier may be briefly referred to as a quality of service identifier.

S130. If the second message does not carry a second reflective quality of service identifier RQI, the user equipment generates a first quality of service rule based on the second message and the correspondence between the first NQI and the first RQI.

If the second message received by the user equipment does not carry the RQI identifier, the user equipment determines, based on the correspondence that is between the NQI and the RQI and that is received from the control plane network element in S110 and an NQI corresponding to a bearer used by the user equipment for receiving the second message, to activate the RQ mechanism, and generates, based on the RQ mechanism, a quality of service rule for transmitting the uplink data. If the generated quality of service rule is not included in an existing quality of service rule of the user equipment, the user equipment needs to generate a new quality of service rule, and the quality of service rule may be referred to as an implicit quality of service rule (implicit QoS rules). The implicit quality of service rule generated by using the method may be referred to as a control plane implicit quality of service rule (C-Plane implicit QoS rules). For example, an IP 5-tuple of the downlink data includes a source IP address Y, a destination IP address X, a source IP port number B, a destination IP port number A, and a protocol type C. An IP 5-tuple of a reversed uplink packet filter includes a source IP address X, a destination IP address Y, a source IP port number A, a destination IP port number B, and a protocol type C.

The user equipment generates the implicit quality of service rule based on the IP 5-tuple of the downlink data, the quality of service identifier NQI or a QoS class identifier (QoS Classification Identifier, QCI) corresponding to the quality of service for transmitting the second message, and the RQ mechanism. The quality of service rule includes a correspondence between the uplink packet filter and the quality of service identifier NQI. The uplink packet filter includes parameter information of the IP 5-tuple used to filter the uplink data, and the IP 5-triple includes the source IP address, the destination IP address, the source IP port number, the destination IP port number, the protocol type, and the like.

It should be noted that, in this embodiment of the present application, the quality of service identifier NQI is indicated as a QoS quality of service identifier in a 5G network, and may be one or more parameters, for example, a combination of a forwarding priority, a delay, and a packet loss rate, similar to a QoS class identifier in an EPS.

It should be noted that, in this embodiment of the present application, the uplink packet filter may be briefly referred to as an uplink filter (UL Packet filters). In addition, a newly generated uplink filter may be referred to as a temporary uplink filter.

It should be further noted that, in this embodiment of the present application, the generated implicit quality of service rule may further include the reflective quality of service rule priority RQP, to indicate a matching priority order of the C-plane implicit QoS rule.

It should be understood that, if the quality of service rule generated by the user equipment based on the RQ mechanism is included in the existing quality of service rule of the user equipment, a new quality of service rule does not need to be generated.

When receiving the uplink data that matches the newly generated or the existing uplink filter, the user equipment transmits the uplink data by using a quality of service rule corresponding to the uplink filter, to implement transmission of uplink data of the user equipment based on the RQ mechanism.

According to the data transmission method provided in this embodiment of the present application, the RQ mechanism of the user equipment is activated based on the correspondence that is between the NQI and the RQI and that is sent by the control plane network element, and a received message that does not carry the RQI and that is sent by the user plane network element, and a quality of service rule for transmitting the uplink data is generated or determined based on the RQ mechanism, to implement transmission of uplink data of the user equipment based on the reflective QoS mechanism.

In comparison with first configuring a large quantity of uplink TFTs by the control plane network element for the UE, activating the RQ mechanism when downlink data sent by the user plane network element is received, and determining, in a large quantity of TFTs, the quality of service rule for transmission of uplink data, a signaling resource between the control plane network element and the user equipment and storage space of the user equipment are saved in the present application.

In addition, this embodiment of the present application further implements RQ control of a coarse granularity (such as the NQI) by using a signaling plane, and RQ control of a fine granularity (such as a flow) by using a user plane.

It should be noted that, in this embodiment of the present application, the C-plane implicit QoS rule may be dynamically sent by the control plane network element to the user equipment and the user plane network element, and that the control plane network element sends indication information RQP of a matching priority order to the user equipment and/or the user plane network element is similar to a process in which a control plane network element sends information to the user equipment and/or a user plane network element in 4G For brevity, details are not described herein.

It should be understood that, in this embodiment of the present application, there is no time sequence between S110 and S120. The user equipment may perform S120 first and then perform S110, or may perform S110 and S120 at the same time. This is not limited in this embodiment of the present application.

Optionally, in another embodiment of the present application, the first message may further include a first reflective quality of service rule priority (RQP). The first RQP is used to indicate a matching priority order of the first quality of service rule generated by the user equipment based on the second message and the correspondence between the first NQI and the first RQI.

To be specific, the RQP is used to indicate the matching priority order of the implicit quality of service rule (implicit QoS rules) generated by the user equipment based on the RQ mechanism, so that the user equipment determines, based on the RQP, the priority order of the quality of service rule used to match the uplink data.

For example, the UE maintains a quality of service rule A, a quality of service rule B, and a quality of service rule C. The matching priorities in descending order are the quality of service rule A, the quality of service rule B, and the quality of service rule C. In other words, a priority of the quality of service rule A is the highest, a priority of the quality of service rule B is the second highest, and a priority of the quality of service rule C is the lowest. When receiving the uplink data, based on the matching priorities of the quality of service rules, the UE first determines whether the uplink data matches the quality of service rule A, if the uplink data does not match the quality of service rule A, determines whether the uplink data matches the quality of service rule B, and if the uplink data does not match the quality of service rule B, determines whether the uplink data matches the quality of service rule C. Therefore, even if the quality of service rule A and the quality of service rule B include a same packet filter, a quality of service rule used to send a packet matching the packet filter is determined based on the matching priority.

The implicit quality of service rule generated by the user equipment based on the RQ mechanism includes a control plane implicit quality of service rule (C-Plane implicit QoS rules) and a user plane implicit quality of service rule (U-Plane implicit QoS rules). The user plane implicit quality of service rule is the implicit quality of service rule generated by the user equipment based on the RQ mechanism after the user equipment activates the RQ mechanism based on the RQI carried in the second message sent by the user plane network element.

The first message may be specifically, for example:

RQI granularity (NQI1, RQI (no marking)), RQPx; or
UL packet filter 3→(NQI3, no RQI), RQPm.

The first message is separately used to indicate that:
a matching priority order of the C-plane implicit QoS rule in the quality of service rule in the user equipment is RQPx; or uplink data matching the UL packet filter 3 is transmitted by using a quality of service rule corresponding to the NQI3, and the reflective QoS mechanism does not need to be activated. A matching priority order of the quality of service rule "UL packet filter 3→(NQI3, no RQI)" is RQPm.

In addition, the first message may further include priority indication information of the U-plane implicit QoS rule, and may be specifically, for example:

RQPy for U-plane implicit QoS rule.

The priority indication information is used to indicate that the matching priority order of the U-plane implicit QoS rule is RQPy. In this embodiment of the present application, the RQPy is a default value, and has a highest matching priority order during transmitting of the uplink data by the user equipment.

It should be noted that, in this embodiment of the present application, numbers 1, 2, and 3 are used to distinguish different NQIs, and letters x and m are used to distinguish different RQPs. The numbers and letters do not constitute any limitation on the solutions of the present application. In this embodiment of the present application, another manner may alternatively be used for distinguishing. This is not limited in this embodiment of the present application.

Figure 4:
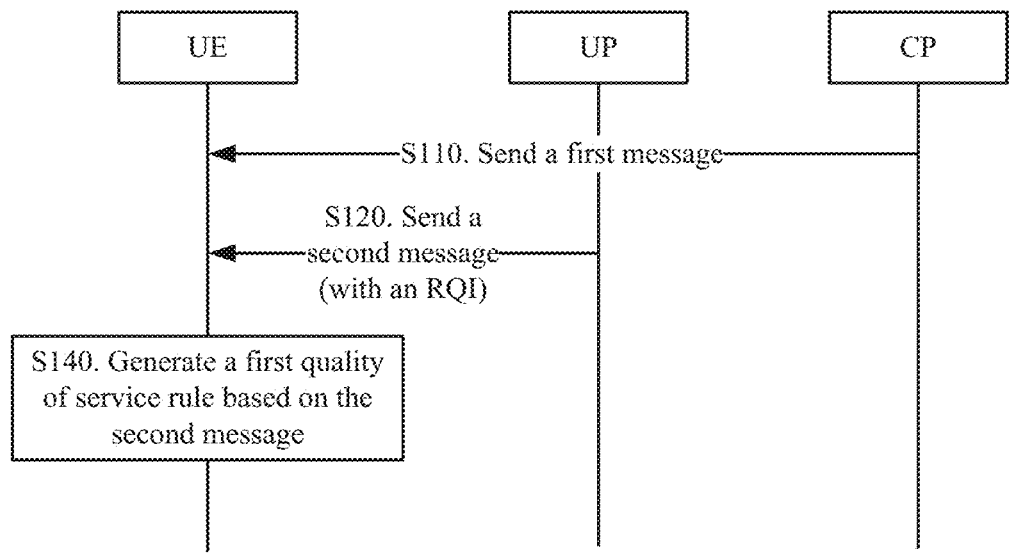
FIG. 4 is a flowchart of another data transmission method according to an embodiment of the present application.

Optionally, in another embodiment of the present application, as shown in FIG. 4, the method 100 may further include the following steps.

S140. If the second message carries a second RQI, the user equipment generates a second quality of service rule based on the second message.

If the second message sent by the user plane network element and received by the user equipment carries the RQI, the user equipment activates the RQ mechanism based on the RQI, and generates a quality of service rule based on the RQ mechanism. The quality of service rule may be referred to as a user plane implicit quality of service rule (U-Plane implicit QoS rules). In this embodiment of the present application, the user equipment may generate the quality of service rule, namely, the U-plane implicit QoS rule, based on the IP 5-tuple of the downlink data in the second message, the quality of service identifier NQI or the QoS class identifier (QCI) corresponding to the quality of service for transmitting the second message, and the RQ mechanism. The quality of service rule includes a correspondence between the uplink packet filter and the quality of service identifier NQI. The uplink filter may be referred to as a temporary uplink filter. A specific process is similar to the process in which the user equipment generates the C-plane implicit QoS rule based on the second message. For detailed description, refer to S130 in FIG. 3. For brevity, details are not described herein again.

It should be noted that, in this embodiment of the present application, the generated quality of service rule may further include the reflective quality of service rule priority RQP, to indicate the matching priority order of the U-plane implicit QoS rule.

According to the data transmission method provided in this embodiment of the present application, the marking indication information of the RQI sent by the control plane is used to instruct the UL to use the RQ mechanism for one type of aggregated data flow, for example, for all services mapped to a same NQI, to implement coarse-grained quality of service control. The RQI is added to the message sent by the user plane network element, thereby implementing fine-grained data flow control. In addition, based on the RQ mechanism, transmission of uplink data is implemented.

The solution may be separately implemented, to complete transmission of uplink data based on the RQ mechanism. In solutions of S110, S120, and S130 in FIG. 3, the reflective quality of service parameter is indicated by using the signaling plane and the user plane. Compared with a separately implemented solution in which the reflective quality of service parameter is indicated only by using the user plane in FIG. 4, RQI marking does not need to be performed in each packet of each data flow. Especially when the downlink packet filter carries a wildcard, a large quantity of packets matching the downlink packet filter need to be marked with RQIs, in this embodiment of the present application, RQI parameter transmission by using the signaling plane saves a large quantity of transmission resources of the user plane.

Optionally, in another embodiment of the present application, the first message further includes a second reflective quality of service rule priority RQP, and the second RQP is used to indicate a matching priority order of the second quality of service rule generated by the user equipment based on the second message.

The user equipment may obtain the indication information of the matching priority order, namely, the RQP, of the U-plane implicit QoS rule from the control plane network element, so that when receiving the uplink data matching the U-plane implicit QoS rule, the user equipment determines the matching priority order of the quality of service rule based on the RQP.

The priority order of the user plane implicit quality of service rule usually has a highest priority during transmitting uplink data of all services by the user equipment, and a value of the priority order may be a default value.

Optionally, in another embodiment of the present application, at least one of the first message or the second message includes an aging time, and the aging time is a time threshold from last use of the first quality of service rule or the second quality of service rule to a current moment.

In other words, the first message received by the user equipment from the control plane network element may include the aging time, and the aging time is a preset time threshold from last use of the C-plane implicit QoS rule to transmit the uplink data to a current moment.

The second message received by the user equipment from the user plane network element may also include the aging time, and the aging time is a preset time threshold from last use of the U-plane implicit QoS rule to transmit the uplink data to a current moment.

In this embodiment of the present application, the aging time may be customized according to a requirement. In this embodiment of the present application, a value of the aging time is not limited.

Figure 5:
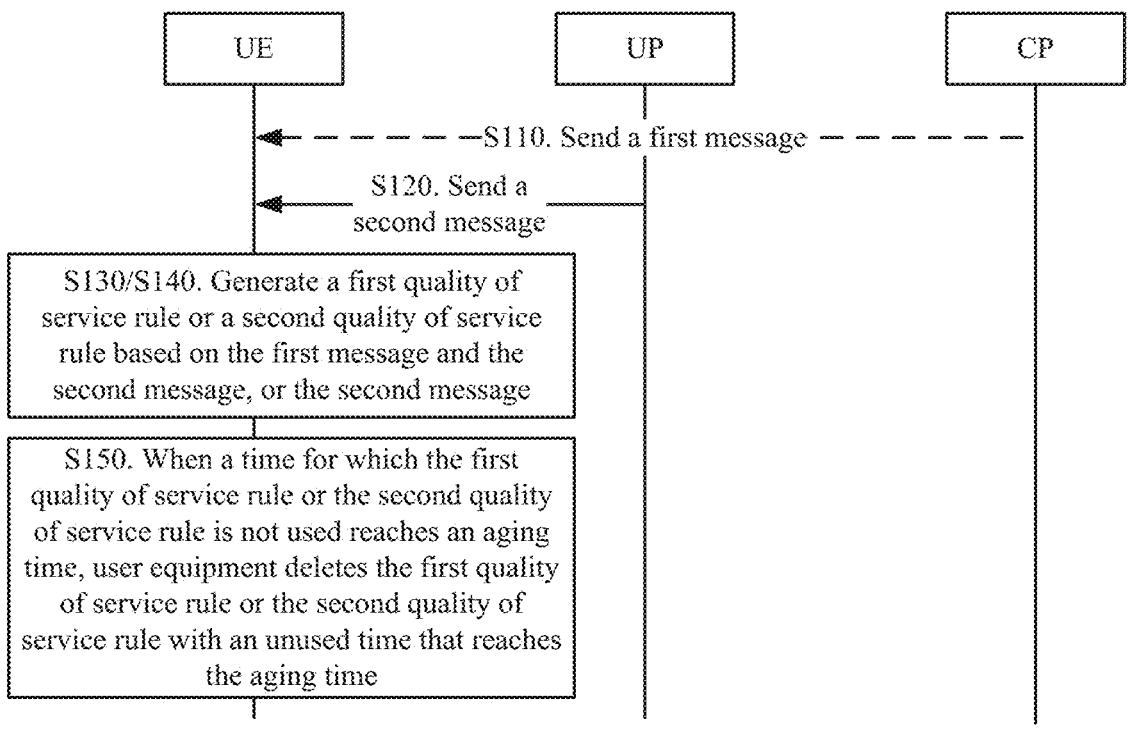
FIG. 5 is a flowchart of still another data transmission method according to an embodiment of the present application.

As shown in FIG. 5, the method 100 may further include the following step:

S150. When a time for which the first quality of service rule or the second quality of service rule is not used reaches the aging time, the user equipment deletes the first quality of service rule or the second quality of service rule with an unused time that reaches the aging time.

When the user equipment determines, based on the aging time, an implicit quality of service rule with an unused time that reaches the aging time, including the C-plane implicit QoS rule and the U-plane implicit QoS rule, the user equipment deletes the implicit quality of service rule, so that the user equipment manages the quality of service rule based on the RQ, and at the same time, and deletes some quality of service rules that are not temporarily used, thereby saving some resources and improving system performance.

It should be noted that, in this embodiment of the present application, in addition to deleting the uplink filter based on the aging time, the user equipment may further delete, based on disconnection of a session, an uplink filter related to the session.

Optionally, in another embodiment of the present application, the at least one of the first message or the second message further includes at least one of an RQI use time, an RQI use granularity, an RQI use mode, or a use granularity of the aging time.

The RQI use time is an available time of the first quality of service rule or the second quality of service rule. The RQI use granularity is a use unit of the first quality of service rule or the second quality of service rule. The RQI use mode is a parameter made of a temporary uplink filter included in the first quality of service rule or the second quality of service rule.

In other words, the RQI use time is used to indicate an effective time of an RQ parameter corresponding to the RQI.

The RQI use granularity is used to indicate a use scope of the RQI, including data transmission in units such as an NQI, a flow priority indicator (FPI), a QCI, a protocol data unit (PDU) session, user equipment, or a data flow.

For example, if the RQI use granularity is an NQI, an FPI, or a QCI, it indicates that uplink data of all PDU sessions of DRBs corresponding to the NQI, the FPI, or the QCI may use the reflective QoS.

If the RQI use granularity is a PDU session, it indicates that uplink data of the PDU session uses the reflective QoS.

If the RQI use granularity is UE, it indicates that all uplink data of the UE uses the reflective QoS.

If the RQI use granularity is a flow, it indicates that uplink data on the flow uses the reflective QoS.

It should be noted that a signaling message delivered by the user plane network element may simultaneously include a mixture of a plurality of granularities, for example, the signaling message may indicate that a flow 1, a PDU session 2, and a PDU session 3 use the reflective QoS mechanism. In this embodiment of the present application, no limitation is imposed on a mixture of the granularities.

The RQI use mode, namely, an RQ mode, indicates a packet filter mode generated based on the RQ mechanism, namely, parameters required in the packet filter. The parameters may be, for example, any combination of parameters in the IP 5-tuple. To be specific, various 2-tuple modes, 3-tuple modes, 4-tuple modes, 5-tuple modes, and the like may be implemented. RQ mode IDs may be used to indicate different RQMs.

For example, the IP 5-tuple mode may be:
a source IP address;
a destination IP address;
a source port number;
a destination port number; and
a protocol type.

The 4-tuple mode may be:
a source IP address;
a destination IP address;
a source port number; and
a destination port number;
or,
a source IP address;
a destination IP address;
a source port number; and
a protocol type.

The 3-tuple mode may be:
a source IP address;
a destination IP address; and
a protocol type;
or,
a destination IP address;
a source port number; and
a destination port number;

or,
a destination IP address;
a destination port number;
a protocol type;
and so on.

It should be noted that the RQ mode may correspond to the PDU session, the flow, or the NQI. It is necessary to indicate that the RQ mode corresponds to the PDU session, the flow, or the NQI during sending of the RQ mode. The PDU session is identified by using a PDU session ID or one or more 5-tuple identifiers, and the flow is identified by using a flow ID or a 5-tuple identifier.

It should be noted that the RQ mode may be delivered by a network control plane network element to the UE during establishment of the PDU session.

It should be noted that the RQ mode may be a combination of other parameters. This is not limited in this embodiment of the present application.

It should be further noted that one RQI may correspond to a plurality of RQ modes. An RQ mode currently used by the RQI may be modified according to a specific scenario or requirement.

The use granularity of the aging time is used to indicate a use unit of the uplink filter in the quality of service rule.

For example, the use granularity of e aging time may be an NQI, an FPI, a QCI, a PDU session, UE, a flow, or the like.

If the use granularity of the aging time is an NQI, an FPI, or a QCI, a delivered QoS rule includes the aging time and the NQI, the FPI, or the QCI. The NQI, the FPI, and the QCI correspond to DRBs, and UL filters mapped to a same DRB based on the RQ mechanism use a same aging time.

If the use granularity of the aging time is a PDU session, a delivered QoS rule includes the aging time and the PDU session. A UL filter generated by the UE based on the RQ mechanism uses a different aging time in a different PDU session. In other words, for different PDU sessions on a same DRB, the UL filter has a different aging time.

If the use granularity of the aging time is UE, a delivered QoS rule includes the aging time. All UL filters generated by the UE based on the RQ mechanism uniformly use a same aging time.

If the use granularity of the aging time is a flow, a delivered QoS rule includes the aging time and a flow ID. All UL filters generated on the flow based on the RQ mechanism uniformly use a same aging time. In this embodiment of the present application, information included in the first message and/or the second message may be used to manage and process a quality of service rule newly established by the user equipment based on the second message, to improve system performance.

It should be noted that "first" and "second" in this embodiment of the present application are only intended to distinguish information, but do not limit the information.

Figure 6:
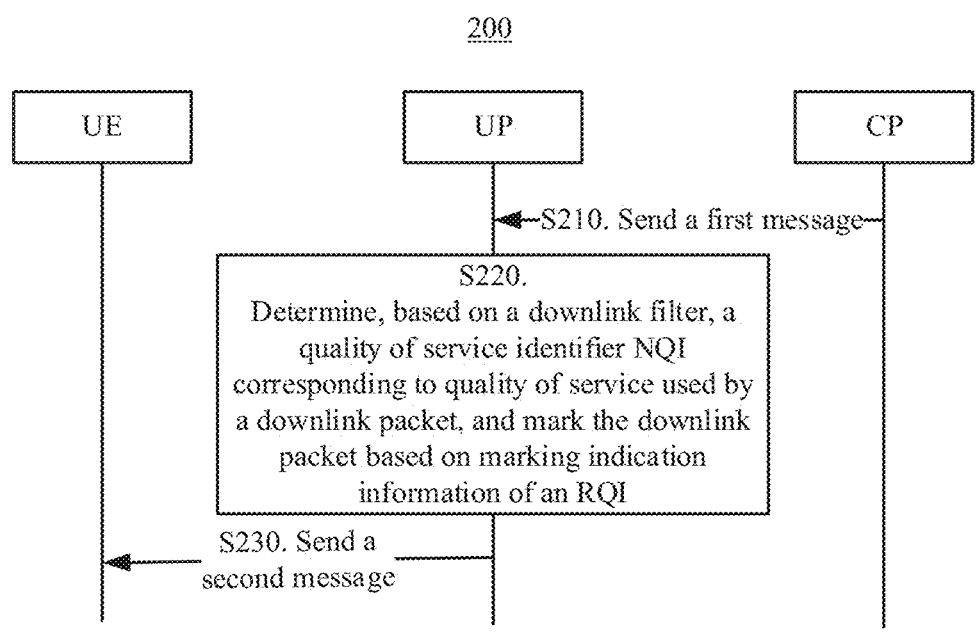
FIG. 6 is a flowchart of yet another data transmission method according to an embodiment of the present application.

Optionally, in another embodiment of the present application, as shown in FIG. 6, a method 201) may further include the following steps.

S210. A user plane network element receives a first message sent by a control plane network element.

The first message may be a signaling message sent by the control plane network element to the user plane network element through an NG4 interface. The signaling message may include a correspondence between a downlink filter, a quality of service identifier NQI, and a reflective quality of service identifier RQI, and includes marking indication information of the RQI.

For example, the message may be specifically:

DL packet filter 1→RQI granularity (NQI1, RQI no marking); or

DL packet filter 2→RQI granularity (NQI2, RQI marking).

The message may be referred to as a quality of service rule, and an information parameter included therein, such as the NQI or the RQI, may be referred to as a reflective quality of service parameter. The message is used to indicate that:

downlink data matching the DL packet filter 1 is transmitted by using a quality of service rule corresponding to the NQI1, and the reflective QoS mechanism needs to be activated, but RQI marking does not need to be performed in a packet; and downlink data matching the DL packet filter 2 is transmitted by using a quality of service rule corresponding to the NQI2, the reflective QoS mechanism needs to be activated, and RQI marking may be performed in all downlink packets transmitted by using the quality of service rule corresponding to the NQI2.

For example, the DL packet filter 1 indicates a special type of web service, such as Facebook, YouTube, and Google Maps. In this embodiment of the present application, the user plane network element UP receives "packet filter 1 of Facebook, YouTube, Google Maps, and etc.→RQI granularity (NQI1, RQI no marking), RQPx" sent by the control plane network element CP, or the CP sends "packet filter of Facebook, YouTube, Google Maps, and etc.→RQI granularity (NQI1, RQI no marking), RQPx" to the UP. After the UP receives the message sent by the CP, no RQI marking needs to be performed in all downlink packets of the web services such as Facebook, YouTube, and Google Maps, saving a transmission resource when the UP sends downlink data to user equipment UE. The transmission resource may be an NG3 interface between the UP and an AN, and an air interface between the AN and the UE.

It should be noted that the first message may further be specifically:

DL packet filter 3→(NQI3, no RQI).

The message may be referred to as an explicit quality of service rule (explicit QoS rules), and a parameter included therein may be referred to as an explicit quality of service parameter (explicit QoS Parameters). The message is used to indicate that:

downlink data matching the DL packet filter 3 is transmitted by using a quality of service rule corresponding to the NQI3, and the reflective QoS mechanism does not need to be activated.

S220. The user plane network element determines, based on a downlink filter, a quality of service identifier NQI corresponding to quality of service used by a downlink packet, and marks the downlink packet based on marking indication information of an RQI.

Figure 7:
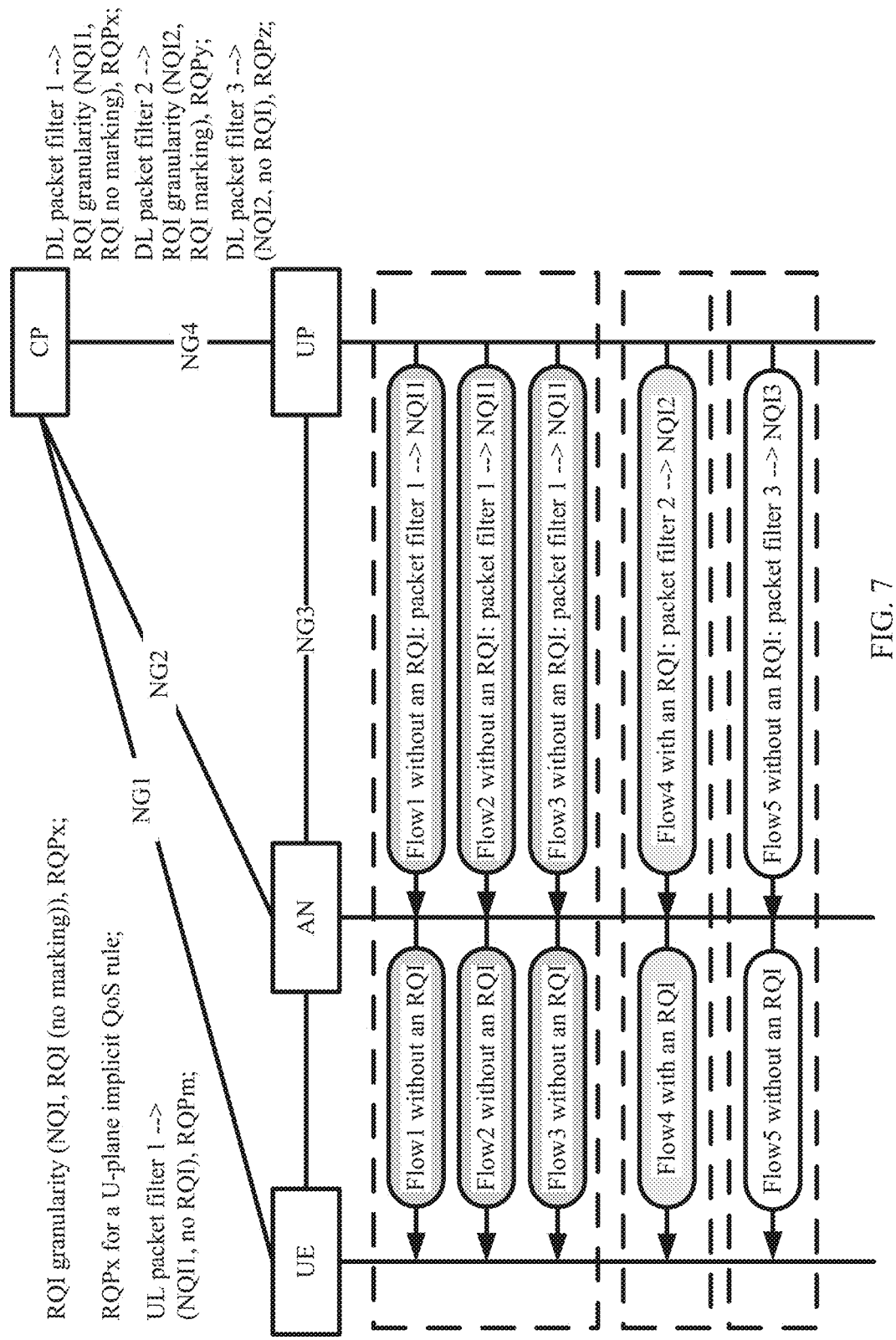
FIG. 7 is a schematic diagram of a data transmission method according to an embodiment of the present application.

As shown in FIG. 7, if the message sent by the control plane network element and received by the user plane network element is: DL packet filter 1→RQI granularity (NQI1, RQI no marking), packets of a flow 1, a flow 2, and a flow 3 are mapped based on the packet filter 1 to the NQI1 for transmission, the reflective QoS mechanism needs to be activated (reflective QoS activation is mainly implemented in the UE), but RQI marking does not need to be performed in the packets.

For example, if downlink packets of web services such as Facebook, YouTube, and Google Maps match the packet filter 1, the downlink packets are transmitted by using the NQI1, and no marking is performed in the downlink packets of the web services.

If the message sent by the control plane network element and received by the user plane network element is, for example, DL packet filter 2→RQI granularity (NQI2, RQI marking), a packet of a flow 4 is mapped based on the packet filter 2 to the NQI2 for transmission, the reflective QoS mechanism needs to be activated, and RQI marking needs to be performed in the packet.

If the message sent by the control plane network element and received by the user plane network element is: DL packet filter 3→(NQI3, no RQI), a packet of a flow 5 is mapped based on the packet filter 3 to the NQI3 for transmission, and the reflective QoS mechanism does not need to be activated.

The marking indication information of the RQI sent by the control plane is received, to instruct the UE to use the RQ mechanism for one type of aggregated data flow, for example, for all services mapped to a same NQI, to implement coarse-grained quality of service control, for example, to use the RQ mechanism in all flows on a same NQI. The RQI indication information sent by the control plane is received, and the RQI is added to or configured in a downlink packet corresponding to the RQI granularity, to indicate fine-grained (finer-granularity) quality of service control, for example, quality of service control on each flow.

S230. The user plane network element sends a second message to user equipment.

The second message is used to instruct the user equipment to or not to use a reflective quality of service RQ mechanism. The user plane network element may filter, by using the downlink filter, the downlink data and provide filtered downlink data to a quality of service rule corresponding to the quality of service identifier NQI. For example, the NG3 interface and the air interface send the second message to the user equipment. The NG3 interface may be an interface between the UP and the AN, and the air interface is an interface between the UE and the AN.

For example, if the message sent by the control plane network element and received by the user plane network element is, for example, DL packet filter 2→RQI granularity (NQI2, RQI marking), after S220 is completed, the user plane network element sends the second message to the user equipment, and the second message does not carry the RQI. After receiving the second message, the user equipment activates the RQ mechanism, and performs S130 in FIG. 3.

If the message sent by the control plane network element and received by the user plane network element is: DL packet filter 1→RQI granularity (NQI1, RQI no marking), after S220 is completed, when the user plane network element sends the second message to the user equipment, the second message includes the RQI. After receiving the second message, the user equipment further needs to perform S140 in FIG. 4. For brevity, details are not described herein again.

It should be noted that the second message in this embodiment and the second message sent by the user plane network element to the user equipment in FIG. 3 and FIG. 4 are a same message.

According to the data transmission method provided in this embodiment of the present application, the ROI is received by the user plane, or a signaling plane and the user plane, and the RQ mechanism is activated, thereby implementing transmission of uplink data by the user equipment based on the reflective QoS mechanism. The marking indication information of the RQI sent by the control plane is received, to instruct the UE to use the RQ mechanism for one type of aggregated data flow, for example, for all services mapped to a same NQI, to implement coarse-grained quality of service control, for example, to use the RQ mechanism in all flows on a same NQI. In addition, the control plane network element marks the downlink packet with an RQI based on the received marking indication information of the RQI, to avoid configuring an RQI mark in a corresponding downlink packet of each reflective service granularity, and saving transmission resources of NG3 and air interfaces.

Optionally, in another embodiment of the present application, the first message may further include a reflective quality of service rule priority RQP, and the RQP is used to indicate match order of the quality of service rule.

For example, the first message sent to the control plane network element and received by the user plane network element may be specifically:

DL packet filter 1→RQI granularity (NQI1, RQI no marking), RQPx; or

DL packet filter 2→RQI granularity (NQI2, RQI marking), RQPy, or

DL packet filter 3→(NQI3, no RQI), RQPz.

The message may be separately used to indicate that:

a matching priority of the quality of service rule "DL packet filter 1→RQI granularity (NQI1, RQI no marking)" is RQPx; or a matching priority of the quality of service rule "DL packet filter 2→ROI granularity (NQI2, RQI marking)" is RQPy; or a matching priority of the quality of service rule "DL packet filter 3→(NQI3, no RQI)" is RQPz.

It should be noted that, in this embodiment of the present application, numbers 1, 2, and 3 are merely used to distinguish different D packet filters or NQIs, and letters x, y, and z are used to distinguish different RQPs. The numbers and letters do not constitute any limitation on the solutions of the present application. In this embodiment of the present application, another manner may alternatively be used for distinguishing. This is not limited in this embodiment of the present application.

Optionally, in another embodiment of the present application, the first message may further include at least one of a use time of the RQI, a use granularity of the RQI, a use mode of the RQI, an aging time, or a use granularity of the aging time.

The aging time is a time from last use of a quality of service rule generated by the user equipment based on the second message to a current moment; the RQI use time is a use time of the quality of service rule generated by the user equipment; the RQI use granularity is a use unit of the quality of service rule generated by the user equipment; and the RQI use mode is a parameter mode of a temporary uplink filter included in the quality of service rule generated based on the second message.

Functions or meanings of parameters in this embodiment of the present application are the same as functions or meanings of parameters in the first message or the second message in FIG. 3 and FIG. 4. For brevity, details are not described herein again.

In addition, the data transmission methods provided in the embodiments in FIG. 3 to FIG. 7 may further save a transmission resource when the UP sends downlink data to the user equipment UE. As shown in FIG. 2, the transmission resource includes an NG3 transmission resource between the UP and the AN, and an air interface transmission resource between the AN and the UE.

For example, the DL packet filter 1 indicates a type of web service, such as Facebook, YouTube, and Google Maps. In this embodiment of the present application, the user plane network element UP receives "packet filter of Facebook, YouTube, Google Maps, and etc.→RQI granularity (NQI1, RQI no marking), RQPx" sent by the control plane network element CR or the CP sends "packet filter of Facebook, YouTube, Google Maps, and etc.→RQI granularity (NQI1, RQI no marking), RQPx" to the UP. After the UP receives the message sent by the CP no RQI marking needs to be performed in all downlink packets of the web services such as Facebook, YouTube, and Google Maps, saving a transmission resource when the UP sends downlink data to the user equipment UE. The transmission resource may be the NG3 interface between the UP and the AN, and the air interface between the AN and the UE.

If the user equipment receives the downlink packets of the web services such as Facebook, YouTube, and Google Maps, the user equipment determines, based on the received "RQI granularity (NQI1, RQI no marking)" sent by the control plane network element through the NG1 interface, that the RQ mechanism is activated, and if the quality of service rule is not included in an existing quality of service rule of the UE, generates a new C-plane. QoS rule "packet filter 1 of Facebook, YouTube, Google Maps, and etc.→NQI1". If there is uplink data matching the newly generated C-plane implicit QoS rule "packet filter 1 of Facebook, YouTube, Google Maps, and etc.→NQI1", the user equipment sends the uplink data by using the C-plane implicit QoS rule.

The "RQI granularity (NQI1, RQI no marking" sent by the control plane network element through the NG1 interface and received by the user equipment corresponds to the first message received by the user equipment from the control plane network element in S110 in FIG. 3.

In addition, the data transmission methods provided in the embodiments in FIG. 3 to FIG. 7 may further save a transmission resource, and may further save an NG1 transmission resource.

In comparison with that the control plane network element CP sends an explicit quality of service rule, for example. "UL packet filter 3→(NQI3, no RQI), RQPm", to the user equipment through the NG1 interface, that the control plane network element CP sends "RQI granularity "(NQI1, RQI (no marking)). RQPx" to the user equipment UE through the NG1 interface does not require the CP to send filter information to the UE through the NG1 interface. As shown in FIG. 6, if the explicit quality of service rule is modified, the CP needs to update the explicit quality of service rule to the UP and the UE, but the CP does not need to update the RQI granularity "(NQI1, RQI (no marking)), RQPx" to the UE through the NG1 interface, thereby saving a signaling resource of the NG1 interface, and save a large quantity of NG1 signaling resources especially when a filter included in the quality of service rule corresponding to the NQI is dynamically updated.

For example, the DL packet filter 1 filters some special web services such as Facebook, YouTube, and Google Maps. In this embodiment of the present application, the CP may send "packet filter 1 of Facebook, YouTube, Google Maps, and etc.→RQI granularity (NQI1, RQI no marking), RQPx" to the UP, and send "RQI granularity (NQI1, RQI no marking), RQPx" to the LIE, to save an NG1 signaling resource.

After receiving the downlink data sent by the user plane network element, the UE determines, based on the "RQI granularity (NQI1, RQI (no marking))", that the RQ mechanism is already activated. If the quality of service rule for transmitting the downlink data is not included in the existing quality of service rule of the UE, the user equipment generates a new C-plane implicit QoS rule "packet filter of Facebook, YouTube, Google Maps, and etc.→NQI1". If the user equipment receives uplink data matching the C-plane implicit QoS rule, the user equipment sends the uplink data based on the matching priority order RQPx and the C-plane implicit QoS rule "packet filter of Facebook, YouTube, Google Maps, and etc.→NQI1".

If several web services, for example, a new web service 1, a new web service 2, . . . , a new web service N need to be added to a special web service list, and N is a positive integer, the network only needs to update the quality of service rule "packet filter of Facebook, YouTube, Google Maps, and etc.→RQI granularity (NQI1, RQI no marking), RQPx" to "packet filter of Facebook, YouTube, Google Maps, new web server 1, new web server 2, new web server n, and etc.→RQI granularity (NQI1, RQI no marking), RQPx" and sends the updated quality of service rule to the UP, without a need to update any signaling information to the UE, thereby saving an NG1 signaling resource.

Figure 8:
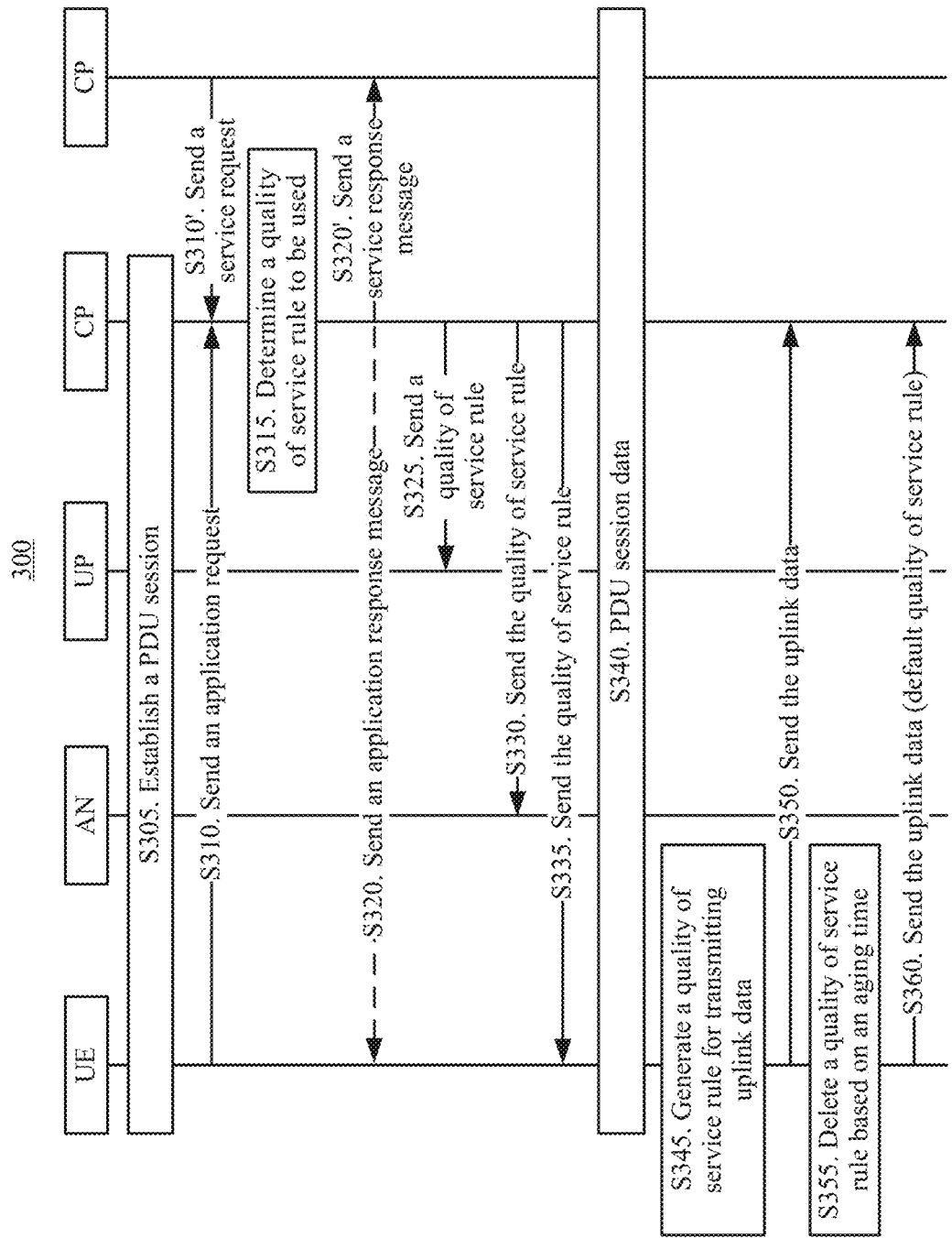
FIG. 8 is a flowchart of still yet another data transmission method according to an embodiment of the present application.

FIG. 8 shows another data transmission method according to an embodiment of the present application. The method 300 may include the following steps.

S305. UE establishes a PDU session with a network.

S310/S310'. The UE sends an application request including a quality of service requirement (QoS requirement) to a control plane network element CP, or an application server sends a service request including a quality of service requirement (QoS requirement) to a control plane network element.

S315. The control plane network element determines a quality of service rule (QoS rule) to be used.

S320/S320'. The control plane network element sends an application response message to the UE, or the control plane network element sends a service response message to the application server.

It should be noted that, in this embodiment of the present application, S320/S320' is an optional step.

S325. The control plane network element sends the QoS rule to a user plane network element UP.

S330. The control plaice network element sends the quality of service rule to an access network AN.

It should be noted that, if a current session is a guaranteed bit rate (GBR) session, the quality of service rule needs to be sent to the AN. If a current session is a non-GBR (non-GBR) session, the quality of service rule does not need to be sent to the AN.

S335. The control plane network element sends the quality of service rule to the UE.

In this embodiment of the present application, in addition to other QoS parameters such as an existing NQI/FPI/QCI and packet filter, the QoS rule may further include an aging time, a use granularity of the aging time, an RQI, and an RQI use granularity.

Implemented functions and meanings of the parameters may be the same as meanings of corresponding parameters in the "first message" or the "second message" in FIG. 3 to FIG. 7. For brevity, details are not described herein again.

S340. The UE receives PDU session data sent through a downlink.

The PDU session data may carry the RQI, so that the UE determines, based on the PDU session data, a quality of service rule for transmitting uplink data.

It should be noted that the PDU session data includes parameter information of the first message sent by the user plane network element to the user equipment in FIG. 3 to FIG. 7, or the PDU session data and the first message are a same message. For brevity, details are not described herein again.

It should be further noted that, in this embodiment of the present application, the PDU session data sent through the downlink and received by the UE may further carry the use granularity of the RQI, to limit a unit for transmitting the uplink data. For example, data transmission may be performed in a unit of a data flow, UE, an NQI, or the like.

The PDU session data may further carry the aging time, and the aging time is a time from last use of a quality of service rule to a current moment.

S345. The UE determines, based on the PDU session data, a quality of service rule for transmitting uplink data.

The UE generates a new quality of service rule based on the received PDU session data. The newly generated quality of service rule includes a temporary uplink filter used to filter the uplink data, and provide uplink data meeting the temporary uplink filter to a bearer corresponding to corresponding quality of service for transmission.

In this embodiment of the present application, the determining, by the UE based on the PDU session data, a quality of service rule for transmitting uplink data is similar to the process in which the UE determines the first quality of service rule based on the first message in S130 in FIG. 3. For a detailed process, refer to S130 in FIG. 3. For brevity, details are not described herein again.

S350. The UE processes the uplink data based on the quality of service rule.

If the UE receives an uplink packet that meets the quality of service rule, the UE transmits the uplink packet based on the corresponding quality of service rule.

If the UE receives uplink data that meets a temporarily generated uplink filter, the UE uses the quality of service rule corresponding to the temporarily generated uplink filter to transmit the uplink data to the network.

If the UE receives uplink data that meets an existing uplink filter of the UE, the UE uses a quality of service rule corresponding to the existing uplink filter to transmit the uplink data to the network.

In addition, this embodiment of the present application may further include the following steps.

S355. The UE deletes a quality of service rule based on the aging time.

If the user equipment activates the RQ mechanism and generates a new quality of service rule, the newly generated quality of service rule includes a temporarily generated uplink filter (UL Filter). For detailed description, refer to S130 in FIG. 3 and S140 in FIG. 4, or S130/S140 in FIG. 5. For brevity, details are not described herein again.

If the UE further needs to upload data, S360 is performed.

S360. The user equipment uses a default quality of service rule to transmit the uplink data.

It should be noted that, if the user plane network element sends data carrying the RQI to the UE, the UE needs to perform S345 to S360.

According to the data transmission method provided in this embodiment of the present application, the RQ mechanism may be activated by using messages sent by the user plane and the signaling plane, to implement transmission of uplink data based on the RQ mechanism, and at the same time, manage the quality of service rule by the user equipment thereby improving system performance.

The data transmission methods in the embodiments of the present application are described above in detail with reference to FIG. 3 to FIG. 8. The following describes, in detail with reference to FIG. 9 to FIG. 12, the user equipment and the user plane network element in the embodiments of the present application.

Figure 9:
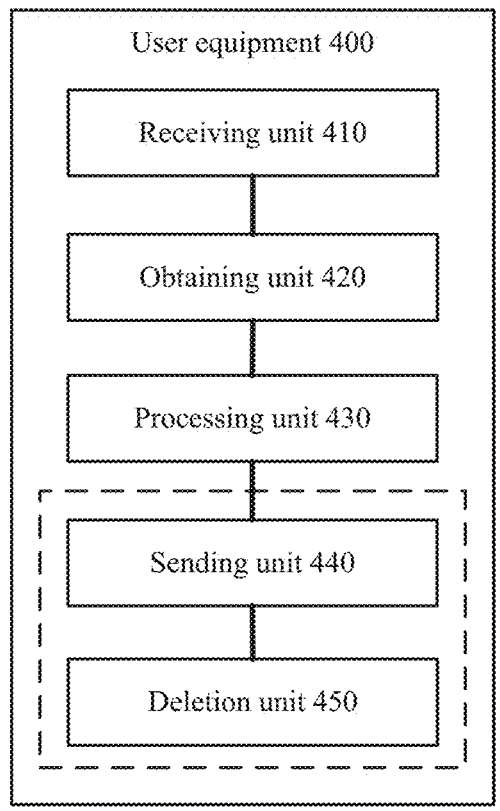
FIG. 9 is a schematic structural diagram of user equipment according to an embodiment of the present application.

FIG. 9 is a schematic structural diagram of user equipment according to an embodiment of the present application.

As shown in FIG. 9, the user equipment 400 may include a receiving unit 410, an obtaining unit 420, and a processing unit 430.

The receiving unit 410 is configured to receive a first message sent by a control plane network element or a user plane network element, where the first message includes a correspondence between a first quality of service identifier NQI and a first reflective quality of service identifier RQI.

The obtaining unit 420 is configured to obtain a second message sent by the user plane network element.

The generation unit is configured to: if the second message does not carry a second reflective quality of service identifier RQI, generate a first quality of service rule based on the second message and the correspondence between the first NQI and the first RQI, where the second RQI is used to instruct the user equipment to activate a reflective quality of service RQ mechanism.

Specifically, the first message may be a singling message sent by the control plane network element, and may specifically include a reflective quality of service parameter, for example, a correspondence between an NQI and an RQI, and indication information RQP of a matching priority order of a reflective quality of service rule. The second message may be downlink data sent by the user plane network element. The receiving unit 410 receives the downlink data sent by the user plane network element, and by using the obtaining unit 420, obtains an NQI corresponding to a quality of service rule used to send the downlink data and learns whether the downlink data includes the RQI. If the second message received by the user equipment does not carry the RQI, the processing unit 430 determines, based on the NQI corresponding to the quality of service rule used to send the second message and the correspondence that is between the NQI and the RQI and that is received from the control plane network element, to activate the RQ mechanism, and generates the first quality of service rule based on the second message. The first quality of service rule may be named an implicit quality of service rule (implicit QoS rules), and may be specifically referred to as a control plane implicit quality of service rule (C-Plane implicit QoS rules).

Optionally, as shown in FIG. 9, in this embodiment of the present application, the user equipment may further include a sending unit 440.

If there is uplink data matching a newly generated implicit quality of service rule, the user equipment transmits the uplink data by using the newly generated implicit quality of service rule, to implement transmission of uplink data of the user equipment based on the RQ mechanism, and at the same time, save a signaling resource between the control plane network element and the user equipment as well as storage space of the user equipment. RQ control of a coarse granularity (such as an NQI) by using a signaling plane, and RQ control of a fine granularity (such as a flow) by using a user plane are further implemented.

Optionally, in another embodiment of the present application, if the second message carries the second RQI, the processing unit 430 is further configured to generate a second quality of service rule based on the second message.

The second quality of service rule is a quality of service rule generated by the processing unit 430 based on the second message received by the receiving unit 410. The quality of service rule may also be referred to as an implicit quality of service rule, and may be specifically referred to as a user plane implicit quality of service rule (U-Plane implicit QoS rules).

Optionally, in another embodiment of the present application, the first message may further include a first reflective quality of service rule priority RQP, and the first RQP is used to indicate a matching priority order of the first quality of service rule generated by the user equipment based on the second message and the correspondence between the first NQI and the first RQI, to indicate a matching priority order of the control plane implicit quality of service rule.

Optionally, in another embodiment of the present application, the first message may further include a second reflective quality of service rule priority RQP, and the second RQP is used to indicate a matching priority order of the second quality of service rule generated by the user equipment based on the second message, to indicate a matching priority order of the user plane implicit quality of service rule in the user equipment. It should be noted that, usually the user plane implicit quality of service rule has a highest priority order in all communication services of transmitting uplink data by the user equipment, to improve QoS guarantee of a communication service.

Optionally, in another embodiment of the present application, at least one of the first message or the second message includes an aging time, and the aging time is a time threshold from last use of the first quality of service rule or the second quality of service rule to a current moment. As shown in FIG. 9, an apparatus 400 may further include a deletion unit 450.

When a time for which the first quality of service rule or the second quality of service rule is not used reaches the aging time, the deletion unit is configured to delete the first quality of service rule or the second quality of service rule with an unused time that reaches the aging time.

Optionally, in another embodiment of the present application, the at least one of the first message or the second message further includes at least one of an RQI use time, an RQI use granularity, an RQI use mode, or a use granularity of the aging time.

The RQI use time is a use time of the first quality of service rule or the second quality of service rule; the RQI use granularity is a use unit of the first quality of service rule or the second quality of service rule; and the RQI use mode is a parameter mode of a temporary uplink filter included in the first quality of service rule or the second quality of service rule.

It should be noted that, in this embodiment of the present application, the user equipment 400 in FIG. 9 corresponds to the user equipment in FIG. 3 and FIG. 5, and corresponds to the execution body of the method 100 in FIG. 3, FIG. 4, and FIG. 5 according to the embodiments of the present application. In addition, the foregoing and other operations and/or functions of the modules in the user equipment are used to implement corresponding procedures of the method in FIG. 3 to FIG. 5. For brevity, details are not described herein again.

Figure 10:
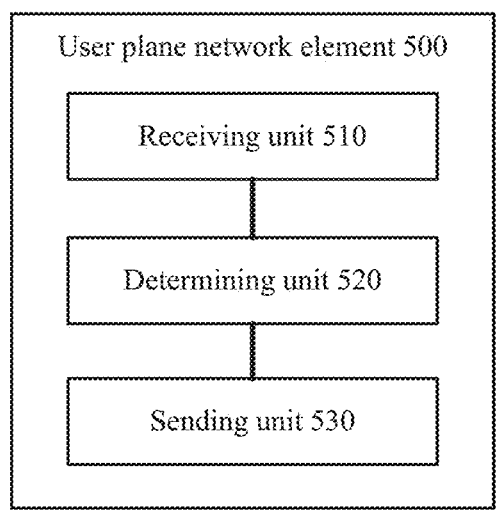
FIG. 10 is a schematic structural diagram of a user plane network element according to an embodiment of the present application.

FIG. 10 is a schematic structural diagram of a user plane network element according to an embodiment of the present application. As shown in FIG. 10, the user plane network element 500 includes a receiving unit 510, a determining unit 520, and a sending unit 530.

The receiving unit 510 is configured to receive a first message sent by a control plane network element, where the first message includes a correspondence between a downlink filter, a quality of service identifier NQI, and a reflective quality of service identifier RQI, and includes marking indication information of the RQI.

The determining unit 520 is configured to determine, based on the downlink filter, a quality of service identifier NQI corresponding to a quality of service rule used by downlink data, and mark the downlink data based on the marking indication information of the RQI.

The sending unit 530 is configured to send a second message to user equipment, where the second message is used to instruct the user equipment to or not to use a reflective quality of service RQ mechanism.

Specifically, the first message may be a signaling message, and may include a reflective quality of service rule, where the reflective quality of service rule includes a reflective quality of service parameter, for example, marking indication information of the RQI, and the correspondence between the downlink filter, the NQI, and the RQI.

Optionally, in this embodiment of the present application, the first message may further include another parameter, for example, a reflective quality of service rule priority RQP used to indicate a matching priority order for sending the second message by the user plane network element to the user equipment.

Optionally, in this embodiment of the present application, the first message may further include at least one of a use time of the RQI, a use granularity of the RQI, a use mode of the RQI, an aging time, or a use granularity of the aging time.

The aging time is a time threshold from last use of a quality of service rule generated by the user equipment based on the second message to a current moment; the RQI use time is a use time of the quality of service rule generated by the user equipment; the RQI use granularity is a use unit of the quality of service rule generated by the user equipment; and the RQI use mode is a parameter mode of a temporary uplink filter included in the quality of service rule.

When the receiving unit 510 receives the first message sent by the control plane network element, and when there is downlink data to be sent, the determining unit 520 determines, based on the downlink filter, the quality of service identifier NQI corresponding to the quality of service rule used by the downlink data, configures, based on the marking indication information of the RQI, the RQI in a header of the downlink packet to be sent, and sends the downlink data to the user equipment by using the corresponding quality of service rule.

The downlink data is sent to the user equipment by the signaling plane and the user plane, so that the user equipment determines, based on the downlink data, to activate the RQ mechanism, and completes transmission of the uplink data. In addition, sending the downlink data to the user equipment by the signaling plane and the user plane saves a transmission resource.

It should be noted that, in this embodiment of the present application, the user plane network element 500 in FIG. 10 corresponds to the user plane network element in FIG. 6, and corresponds to the execution body of the method 200 in FIG. 6 according to the embodiments of the present application. In addition, the foregoing and other operations and/or functions of the modules in the user plane network element are used to implement corresponding procedures of the method in FIG. 6. For brevity, details are not described herein again.

Figure 11:
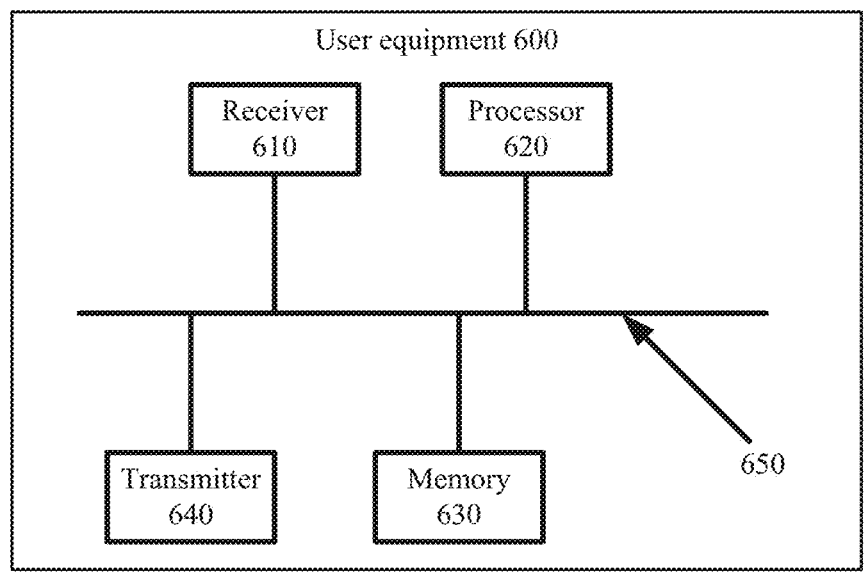
FIG. 11 is a schematic structural diagram of another user equipment according to an embodiment of the present application.

FIG. 11 is a schematic structural diagram of another user equipment according to an embodiment of the present application. As shown in FIG. 11, the user equipment 600 includes: a receiver 610, a processor 620, a memory 630, a transmitter 640, and a communications bus 650, where the receiver 610, the processor 620, the memory 630, and the transmitter 640 are connected through the communications bus 650.

The receiver 610 is configured to receive a first message sent by a control plane network element or a user plane network element, where the first message includes a correspondence between a first quality of service identifier NQI and a first reflective quality of service identifier RQI.

The processor 620 is configured to obtain a second message sent by the user plane network element.

The processor 620 is further configured to: if the second message does not carry a second reflective quality of service identifier RQI, generate a first quality of service rule based on the second message and the correspondence between the first NQI and the first RQI, where the second RQI is used to instruct the user equipment to activate a reflective quality of service RQ mechanism.

If the user equipment receives uplink data matching the first quality of service rule, the transmitter 640 sends the uplink data, thereby completing transmission of uplink data based on the RQ mechanism.

According to the user equipment provided in this embodiment of the present application, transmission of uplink data based on the RQ mechanism may be implemented, thereby further implementing RQ control of a coarse granularity, such as an NQI, at which a signaling plane, namely, the control plane network element sends the first message to the user equipment, and RQ control of a fine granularity, such as a flow, at which the user plane, namely, the user plane network element sends the second message to the user equipment.

It should be noted that the receiver 610, the processor 620, the memory 630, and the transmitter 640 in the user equipment 600 provided in this embodiment of the present application may complete the method/steps S110, S120, S130, S140, and S150 in FIG. 3 to FIG. 5, and operations performed by the units included in the user equipment 400 in FIG. 9. For brevity, details are not described herein again.

Figure 12:
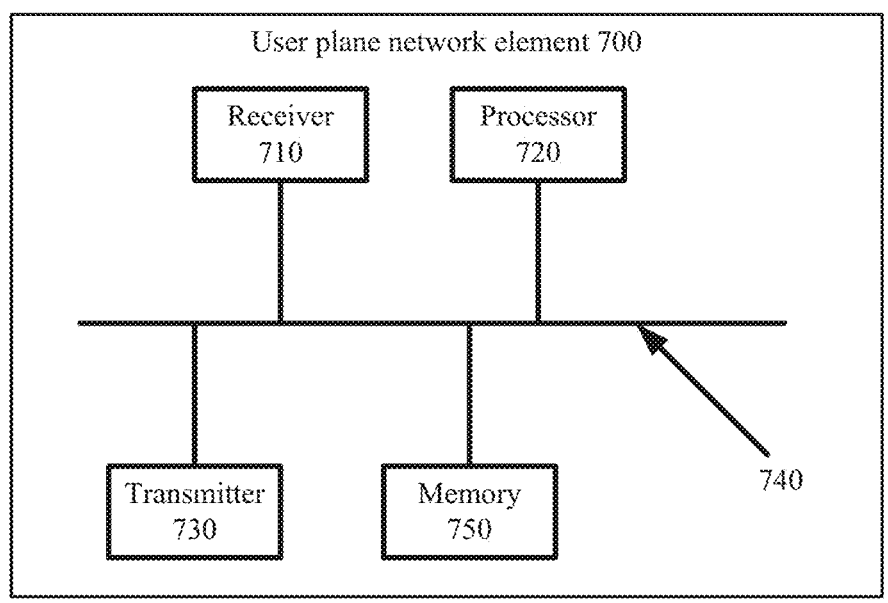
FIG. 12 is a schematic structural diagram of another user plane network element according to an embodiment of the present application.

FIG. 12 is a schematic structural diagram of another user plane network element according to an embodiment of the present application. As shown in FIG. 12, the user plane network element 700 may include a receiver 710, a processor 720, a transmitter 730, and a communications bus 740.

The receiver 710 is configured to receive a first message sent by a control plane network element, where the first message includes a correspondence between a downlink filter, a quality of service identifier NQI, and a reflective quality of service identifier RQI, and includes marking indication information of the RQI.

The processor 720 is configured to determine, based on the downlink filter, a quality of service identifier NQI corresponding to a quality of service rule used by downlink data, and mark the downlink data based on the marking indication information of the RQI.

The transmitter 730 is configured to send a second message to user equipment, where the second message is used to instruct the user equipment to or not to use a reflective quality of service RQ mechanism.

When receiving the second message sent by the user plane network element 700, the user equipment activates the RQ mechanism based on the second message, and generates a quality of service rule. For a detailed process, refer to S110, S120, and S130 in FIG. 3. For brevity, details are not described herein again.

According to the user plane network element provided in this embodiment of the present application, the user plane, or a signaling plane and the user plane receive the RQI, to activate the RQ mechanism, so as to implement transmission of uplink data of the user equipment based on the RQ mechanism and fine-grained quality of service control. In addition, in this embodiment of the present application, the control plane network element marks a downlink packet with an RQI based on the received marking indication information of the RQI, to avoid configuring an RQI in a corresponding downlink packet of each reflective quality of service granularity, and saving a transmission resource.

In addition, in this embodiment of the present application, the user plane network element 700 may further include a memory 750.

It should be noted that the receiver 710, the processor 720, and the transmitter 730 in the user plane network element 700 provided in this embodiment of the present application may complete the method/steps S210, S220, and S230 in FIG. 6, and operations performed by the units included in the user plane network element 500 in FIG. 10. For brevity, details are not described herein again.

It should be understood that, in this embodiment of the present application, the processor 620/720 in FIG. 11 and FIG. 12 may be a central processing unit (CPU). Alternatively, the processor 620/720 may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory 630/750 may include a read-only memory and a random access memory, and provide an instruction and a generated quality of service rule to the processor 620/720. A part of the memory may further include a non-volatile random access memory. For example, the memory may further store information about a device type.

In addition to a data bus, the bus system 650/740 may further include a power bus, a control bus, a status signal bus, and the like. However, for clear description, various types of buses in the figure are marked as the bus system 650/740.

In an implementation process, steps in the foregoing methods can be implemented by using a hardware integrated logical circuit in the processor 620/720, or by using instructions in a form of software. The steps of the method disclosed with reference to the embodiments of the present application may be directly performed by a hardware processor, or may be performed by using a combination of hardware in the processor and a software module. A software module may be located in a mature storage medium in the field, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The foregoing descriptions are merely specific embodiments of the present application, but are not intended to limit the protection scope of the present application. Any modification or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A data transmission method, wherein the method comprises:
   receiving, by a user equipment, downlink data comprising reflective quality of service identifier (RQI) information, wherein the downlink data matches a downlink filter; and
   generating, by the user equipment based on the RQI information, a quality of service rule for transmitting uplink data by a reflective quality of service (RQ) mechanism.

2. The method according to claim 1, wherein the RQI information instructs the user equipment to activate the reflective quality of service (RQ) mechanism.

3. The method according to claim 1, wherein the method comprises:
   receiving, by the user equipment, a first message sent by a control plane network element or a user plane network element, wherein the first message comprises a correspondence between a first next generation quality of service identifier (NQI) and a first RQI.

4. The method according to claim 3, wherein the first message further comprises a first reflective quality of service rule priority (RQP), and wherein the first RQP is used to indicate a matching priority order of the quality of service rule and the correspondence between the first NQI and the first RQI.

5. The method according to claim 3, wherein the first message comprises an aging time, wherein the aging time is a time threshold from last use of a first quality of service rule or the quality of service rule to a current moment, and wherein the method further comprises:
   when a time for which the first quality of service rule or the quality of service rule is not used reaches the aging time, deleting, by the user equipment, the first quality of service rule or the quality of service rule with an unused time that reaches the aging time.

6. The method according to claim 5, wherein the first message further comprises at least one of an RQI use time, an RQI use granularity, an RQI use mode, or a use granularity of an aging time, and wherein:
   the RQI use time is a use time of the first quality of service rule or the quality of service rule;
   the RQI use granularity is a use unit of the first quality of service rule or the quality of service rule; and
   the RQI use mode is a parameter mode of a temporary uplink filter comprised in the first quality of service rule or the quality of service rule.

7. A user equipment, comprising:
   at least one processor; and
   one or more memories coupled to the at least one processor and storing programming instructions for execution by the at least one processor to perform operations comprising:
      receiving downlink data comprising reflective quality of service identifier (RQI) information, wherein the downlink data matches a downlink filter; and
      generating, based on the RQI information, a quality of service rule for transmitting uplink data by a reflective quality of service (RQ) mechanism.

8. The user equipment according to claim 7, wherein the RQI information instructs the user equipment to activate the reflective quality of service (RQ) mechanism.

9. The user equipment according to claim 7, wherein the operations further comprise:
   receiving a first message sent by a control plane network element or a user plane network element, wherein the first message comprises a correspondence between a first next generation quality of service identifier (NQI) and a first RQI.

10. The user equipment according to claim 9, wherein the first message further comprises a first reflective quality of service rule priority (RQP), and wherein the first RQP is used to indicate a matching priority order of a first quality of service rule and the correspondence between the first NQI and the first RQI.

11. The user equipment according to claim 9, wherein the first message comprises an aging time, wherein the aging time is a time threshold from last use of a first quality of service rule or the quality of service rule to a current moment, and wherein the operations further comprise:
    when a time for which the first quality of service rule or the quality of service rule is not used reaches the aging time, deleting, by the user equipment, the first quality of service rule or the quality of service rule with an unused time that reaches the aging time.

12. The user equipment according to claim 11, wherein the first message further comprises at least one of an RQI use time, an RQI use granularity, an RQI use mode, or a use granularity of an aging time, and wherein:
    the RQI use time is a use time of the first quality of service rule or the quality of service rule;
    the RQI use granularity is a use unit of the first quality of service rule or the quality of service rule; and the RQI use mode is a parameter mode of a temporary uplink filter comprised in the first quality of service rule or the quality of service rule.

13. A communications system, comprising:
a control plane network element and a user plane network element;
wherein the control plane network element is configured to send a first message, wherein the first message comprises a correspondence between a downlink filter and a next generation quality of service identifier (NQI), and wherein the first message comprises marking indication information of a reflective quality of service identifier (RQI); and
wherein the user plane network element is configured to:
receive the first message sent by the control plane network element;
determine, based on the downlink filter, the NQI corresponding to a quality of service rule used by downlink data, and mark the downlink data based on the marking indication information of the RQI; and
send information to a user equipment, wherein the information instructs the user equipment to use or not to use a reflective quality of service (RQ) mechanism.

14. The communications system according to claim 13, wherein the first message further comprises a reflective quality of service rule priority (RQP), and wherein the RQP is used to indicate a matching priority order for sending the information by the user plane network element to the user equipment.

15. The communications system according to claim 13, wherein the first message further comprises at least one of a use time of the RQI, a use granularity of the RQI, a use mode of the RQI, an aging time, or a use granularity of an aging time, and wherein:
the aging time is a time threshold from last use of a quality of service rule generated by the user equipment based on the information to a current moment;
the RQI use time is a use time of the quality of service rule generated by the user equipment;
the RQI use granularity is a use unit of the quality of service rule generated by the user equipment; and
the RQI use mode is a parameter mode of an uplink filter comprised in the quality of service rule generated based on the information.

16. The communications system according to claim 13, wherein the communications system further comprises the user equipment, and wherein the user equipment is configured to receive the information.

17. The communications system according to claim 13, wherein determining, based on the downlink filter, the NQI corresponding to the quality of service rule used by the downlink data comprises:
determining that the downlink data matches the downlink filter; and
selecting the NQI corresponding to the downlink filter for the downlink data.

18. A data transmission method, wherein the method comprises:
receiving, by a user plane network element, a first message from a control plane network element, wherein the first message comprises a correspondence between a downlink filter and a next generation quality of service identifier (NQI), and marking indication information of a reflective quality of service identifier (RQI);
determining, by the user plane network element, the NQI corresponding to a quality of service rule used by downlink data, and marking the downlink data based on the marking indication information of the RQI; and
sending, by the user plane network element, information to a user equipment, wherein the information instructs the user equipment to use or not to use a reflective quality of service (RQ) mechanism.

19. The method according to claim 18, wherein the determining, by the user plane network element, the NQI corresponding to a quality of service rule used by downlink data comprises:
determining, by the user plane network element, that the downlink data matches the downlink filter; and
selecting, by the user plane network element, the NQI corresponding to the downlink filter for the downlink data.

20. An apparatus, wherein the apparatus comprises:
at least one processor; and
a memory coupled to the at least one processor and storing programming instruction for execution by the at least one processor to:
receive a first message from a control plane network element, wherein the first message comprises a correspondence between a downlink filter and a next generation quality of service identifier (NQI), and marking indication information of a reflective quality of service identifier (RQI);
determine, based on the downlink filter, the NQI corresponding to a quality of service rule used by downlink data, and mark the downlink data based on the marking indication information of the RQI; and
send information to a user equipment, wherein the information instructs the user equipment to use or not use a reflective quality of service (RQ) mechanism.

21. The apparatus according to claim 20, wherein determining, based on the downlink filter, the NQI corresponding to the quality of service rule used by the downlink data comprises:
determining that the downlink data matches the downlink filter; and
select the NQI corresponding to the downlink filter for the downlink data.

22. A data transmission method, wherein the method comprises:
sending, by a control plane network element to a user plane network element, a first message, wherein the first message comprises a correspondence between a downlink filter and a next generation quality of service identifier (NQI), and marking indication information of a reflective quality of service identifier (RQI);
receiving, by the user plane network element, the first message from the control plane network element;
determining, by the user plane network element based on the downlink filter, the NQI corresponding to a quality of service rule used by downlink data, and marking the downlink data based on the marking indication information of the RQI; and
sending, by the user plane network element, information to a user equipment, wherein the information instructs the user equipment to use or not to use a reflective quality of service (RQ) mechanism.

23. The method according to claim 22, wherein the determining, by the user plane network element based on the downlink filter, the NQI corresponding to a quality of service rule used by downlink data comprises:
determining, by the user plane network element, that the downlink data matches the downlink filter; and selecting, by the user plane network element, the NQI corresponding to the downlink filter for the downlink data.

\* \* \* \* \*

UNITED STATES PATENT AND TRADEMARK OFFICE
CERTIFICATE OF CORRECTION

PATENT NO. : 11,553,372 B2
APPLICATION NO. : 17/127257
DATED : January 10, 2023
INVENTOR(S) : Anni Wei and Chunshan Xiong It is certified that error appears in the above-identified patent and that said Letters Patent is hereby corrected as shown below:

In the Specification

Column 1/Line 8 - Delete "16,381,215," and insert -- 16/381,215, --.

Column 1/Line 9 - Delete "international" and insert -- International --.

Signed and Sealed this
Twenty-fifth Day of April, 2023

*Katherine Kelly Vidal*
Katherine Kelly Vidal
*Director of the United States Patent and Trademark Office*